United States Patent
Yamada et al.

[11] Patent Number: 5,812,215
[45] Date of Patent: Sep. 22, 1998

[54] PROJECTOR DISPLAY UNIT

[75] Inventors: Fusaaki Yamada; Shigeru Takeuchi; Masayuki Nishimitsu; Takashi Ueda; Toshitaka Tachibana, all of Nagaokakyo, Japan

[73] Assignee: Mitsubishi Denki Kabushiki Kaisha, Tokyo, Japan

[21] Appl. No.: 487,677

[22] Filed: Jun. 7, 1995

[30] Foreign Application Priority Data

Jun. 13, 1994 [JP] Japan ................................. 6-130452
Aug. 31, 1994 [JP] Japan ................................. 6-206920

[51] Int. Cl.⁶ ........................... H04N 1/04; H04N 5/64; H04N 5/645
[52] U.S. Cl. .................... 348/825; 348/744; 348/748; 348/745; 348/776; 348/785; 348/826; 348/827; 348/836; 358/485
[58] Field of Search ................................. 348/744, 745, 348/748, 778, 785, 776, 825, 826, 827, 836, 779, 781, 805, 806, 828, 829, 830; 358/485; 353/100, 101; 313/461, 466, 477 R, 480

[56] References Cited

U.S. PATENT DOCUMENTS

| | | | |
|---|---|---|---|
| 3,876,213 | 4/1975 | Miliczky et al. | 277/59 |
| 4,606,628 | 8/1986 | Vance | 353/101 |
| 4,607,924 | 8/1986 | Vance | 353/101 |
| 4,646,143 | 2/1987 | Watanabe et al. | 348/781 |
| 4,777,532 | 10/1988 | Hasegawa | 348/785 |
| 5,250,968 | 10/1993 | Numata et al. | 348/825 |
| 5,381,189 | 1/1995 | Terai et al. | 348/776 |
| 5,537,167 | 7/1996 | Toide et al. | 353/100 |

FOREIGN PATENT DOCUMENTS 241979 11/1990 Japan .
2143884 12/1990 Japan .

*Primary Examiner*—Edward L. Coles
*Assistant Examiner*—Mark Wallerson

[57] ABSTRACT

In a projecting unit of a projector, a projecting tube is sealingly attached to a projecting tube frame by means of a packing member, a projecting lens is sealingly attached to a projecting lens frame by means of a packing member, and an image on the projecting tube is projected on a screen by the projecting lens. A packing member is interposed between and in engagement with the frames such that the frames are sealingly attached, and can slide against said packing member. The frames are secured to each other for use of the projecting unit, or separated from each other to permit adjustment of the space between the frames.

43 Claims, 36 Drawing Sheets

PROJECTOR DISPLAY UNIT

BACKGROUND OF THE INVENTION

This invention relates to a projecting unit of a projector that uses a lens to project an enlarged image onto a screen.

FIG. 43 is a sectional view of a projecting unit of a conventional projector as is disclosed, for example, in Japanese Utility Model Kokoku Publication No. 2-41979, and FIG. 44 is a perspective view of the pertinent parts of same. In the figure, 21 is a projecting tube similar to a cathode ray tube, and 22 is a spacer frame made of a material having good thermal conductance such as aluminum die-cast. A boss 22c having tapped holes 22d is provided on the side of the spacer frame 22 to which the projecting tube 21 is attached. A press plate 23 has an engaging aperture 23a in engagement with an outer wall 21b of the tube 21, and fixing holes 23b provided at four corners of the plate 23. Tubular posts 24 extend through respective fixing holes 23b of the plate 23. One end of each of the posts 24 is in contact with the boss 22c. A spring 25 is wrapped around each post 24. One end of this spring 25 is in contact with the plate 23, while the other end of the spring is in contact with a washer 26. Screws 27 are inserted through the respective washers 26 and are passed through the respective tubular posts 24, and screwed into the tapped holes 22d of the boss 22c so that the press plate 23 is pressed uniformly, and the projecting tube 21 is thereby attached to the spacer frame 22 by the pressing force of the springs 25. A deflection yoke 36, a focusing magnet 37 and a CRT base 38 are also fixed to the projecting tube 21.

A lens barrel 28a of a projecting lens 28 is attached by means of screws 35 to the spacer frame 22 on the side opposite to the side to which the projecting tube 21 is attached. A projecting tube packing 29 and lens packing 30 are disposed between a face 21f of the projecting tube 21 and a projecting tube installation surface 22f of the spacer frame 22, and between a lens surface 28b of the projecting lens 28 and a lens installation surface 22g of the spacer frame 22, respectively. A space 31 surrounded by the projecting tube 21, a projecting lens 28 and a spacer frame 22 is thereby maintained fluid-tight or sealingly closed.

Reference numeral 32 denotes a cooling medium such as ethylene glycol. This cooling medium prevents light emitted by the projecting tube 21 from returning to a fluorescent screen to avoid deterioration of contrast. At the same time, heat generated on the face 21f of the projecting tube 21 when the projector operates, is transferred to the spacer frame 22 via this cooling medium 32, and from there radiated to the outside. A tank 33 absorbs an expansion when the cooling medium 32 undergoes thermal expansion.

Next, the operation of this projector will be described. The projector is a device that, by means of a projecting lens, projects an image on the projecting tube on a large screen. The heat of the face 21f of the projecting tube 21 is radiated via the cooling medium 32 from the spacer frame 22, which is made of a material with good thermal conductance such as aluminum. It is essential that the cooling medium 32 does not leak, so the projecting tube packing 29 and lens packing 30 must be installed in predetermined positions and pressed firmly in contact with the installation surfaces 22f, 22g of the spacer frame 22 by the projecting tube 21 and projecting lens 28.

The cooling medium 32 is formed of a material such as for example ethylene glycol or silicone, having the same refractive index as glass. In addition to its heat radiating function, therefore, light from the projecting tube 21 impinges on the projecting lens 28 without being refracted, and this medium therefore prevents deterioration of contrast.

A projector having three projecting units 83 for the colors red, green and blue, each comprising the projecting tube 21, projecting lens 28 and spacer frame 22, as shown in FIG. 45, to increase brightness, is widely used. In this type of projector, 9, projecting axes of the units 83x–83z are inclined with respect to each other in order that the images produced by projecting tubes 21x–21z coincide at one point on a screen 9, and the relative orientations and distances of projecting tube blocks 81 and projecting lens blocks 82 in the projecting units 83x and 83z on both sides are varied so as to adjust edge focusing.

However, in this type of projector, a horizontal converging angle θ1 and vertical incident angle, not shown, vary according to modifications of the projector such as screen size, projection distance or installation angle. Focusing of the screen center and edges therefore has to be adjusted by modifying a horizontal compensating angle θ2 which is a horizontal tilt angle of the projecting tube with respect to the projecting lens, and a vertical compensating angle, not shown, which is a vertical tilt angle of the projecting tube with respect to the projecting lens.

FIG. 46 is a sectional view of a projecting unit in another conventional projector disclosed in Japanese Utility Model Kokai No. 2-143884. In the figure, the projecting tube 21 is attached to a projecting tube frame 51 by means of an adhesive 41, and the projecting lens 28 is attached to a lens frame 53 via the lens packing 30. At the same time, fluid-tight seal is maintained by an inner surface 53n of the lens frame 53 and a slide packing member 50 inserted in an outer groove 51z of an outer surface 51g of the projecting frame 51, the space enclosed by these elements being filled with the cooling medium 32.

The manner of determining the orientations of the projecting tube frame 51 and lens frame 53 when they are fitted together will now be described. Tightening bolts 49 are passed through holes 51h provided in flanges 51f of the projecting tube frame 51, and passed through holes of spacers 48x, 48y of predetermined thickness disposed on either side, and screwed into tapped parts 53j provided in flanges 53f of the lens frame 53, so that the two frames are joined together with a predetermined orientation.

Since this conventional projector of Japanese Utility Model Kokoku Publication No. 2-41979 also comprised three projecting units, three types of spacer frame are required. Further, when projector types having different projecting distances or screen sizes were developed, new spacer frames had to be made which required long design time and the cost of mold manufacture was high. Further, the orientation of the projecting tube with respect to the projecting lens, was determined by the machining precision of the spacer frame, and if errors occurred in assembly, there was no way of correcting them.

Further, in a projecting unit of Japanese Utility Model Kokai No. 2-143884 shown in FIG. 46, if it was desired to modify the spacers 48 that determined the orientation of the projecting tube and projecting lens, the tightening bolts 49 had to be removed and the projecting unit re-installed from the outside, and this operation could not be performed when three projecting units were installed in the projector. For this reason, changes in the orientation of the projecting tube 21 and projecting lens 28 due to changes of projecting orientation or screen size had to be made by removing the projecting unit from the projector. Further, as the tightening bolts 49 had to pass through the spacers 48 before tightening, the spacers had to be inserted in a narrow space which made working difficult.

Further, to maintain fluid-tight seal between the projecting tube and projecting lens when their orientations are changed, the slide packing member 50 has to be arranged in rigid contact with both frames which requires increasing the compression ratio of the packing, however if the compression ratio is increased, the frames do not slide easily so that it is not easy to change their orientations. It is difficult to compromise the need to maintain fluid-tight seal with the need to change the relative orientation of the frames, and if force is used to make the frames slide when the packing is in rigid contact, there is a risk that the packing member 50 may be damaged.

SUMMARY OF THE INVENTION

This invention was made to overcome the above problems, and its object is to provide a projecting unit of a projector in which the orientation of a projecting tube and a projecting lens can easily be modified, and angles and distances can be set freely even when the projecting unit comprising the tube and lens is assembled inside the projector.

Another object of the invention is to provide a projecting unit of a projector wherein the orientations of a projecting tube and projecting lens can be reliably and easily changed even when three projecting units share the same spacer frame and are assembled inside the projector.

According to the invention, there is provided a projecting unit of a projector wherein a projecting tube is sealingly attached to a projecting tube frame with a packing member, a projecting lens is sealingly attached to a projecting lens frame by means of a packing member, and an image on said projecting tube is enlarged and projected on a screen by the projecting lens, the projecting unit including:

a packing member interposed between and in engagement with the tube frame and the lens frame such that the tube frame and the lens frame are sealingly attached, and the frames can slide against the packing member; and a securing and separating device for securing the tube frame and the lens frame to each other and separating the tube frame and the lens frame from each other.

The securing and separating device may include a bolt that extends through a first one of the frames and has a thread part which is screwed into a tapped part on a second one of the frames so as to secure the frames to each other.

The projecting unit may further include spacers, each of which has pairs of opposite surfaces, distances between the opposite surfaces of the respective pairs being different from each other, and one of the pairs of opposite pairs being selected for engagement with the frames for determining the spacing between said frames.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiment 1

Figure 1:
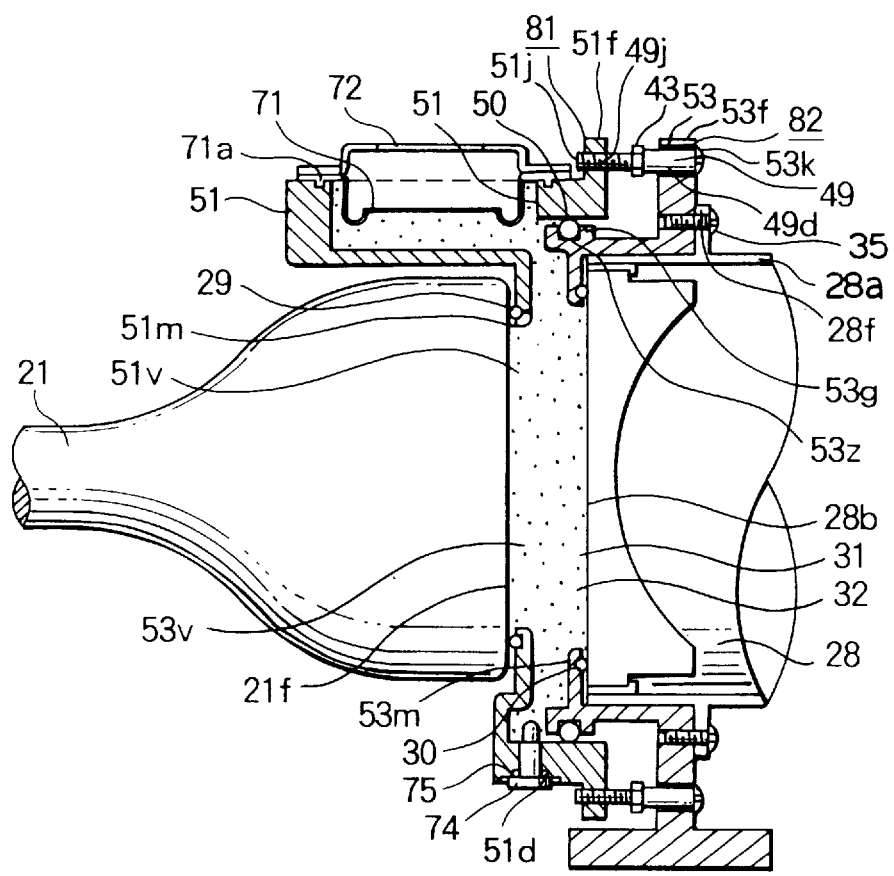
FIG. 1 is a vertical sectional view of a projecting unit of a projector according to a first embodiment of this invention.
Figure 2:
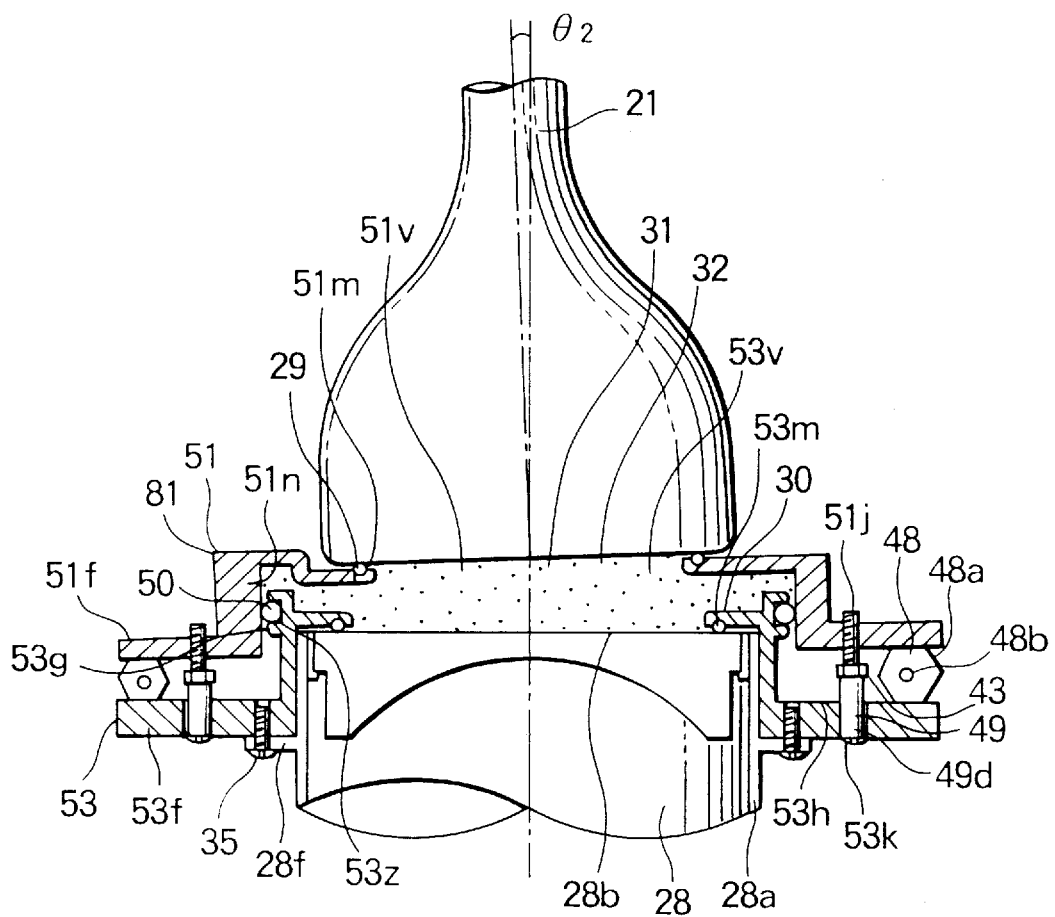
FIG. 2 is a sectional view, as seen from above, of a projecting unit of the projector according to the first embodiment.
Figure 3:
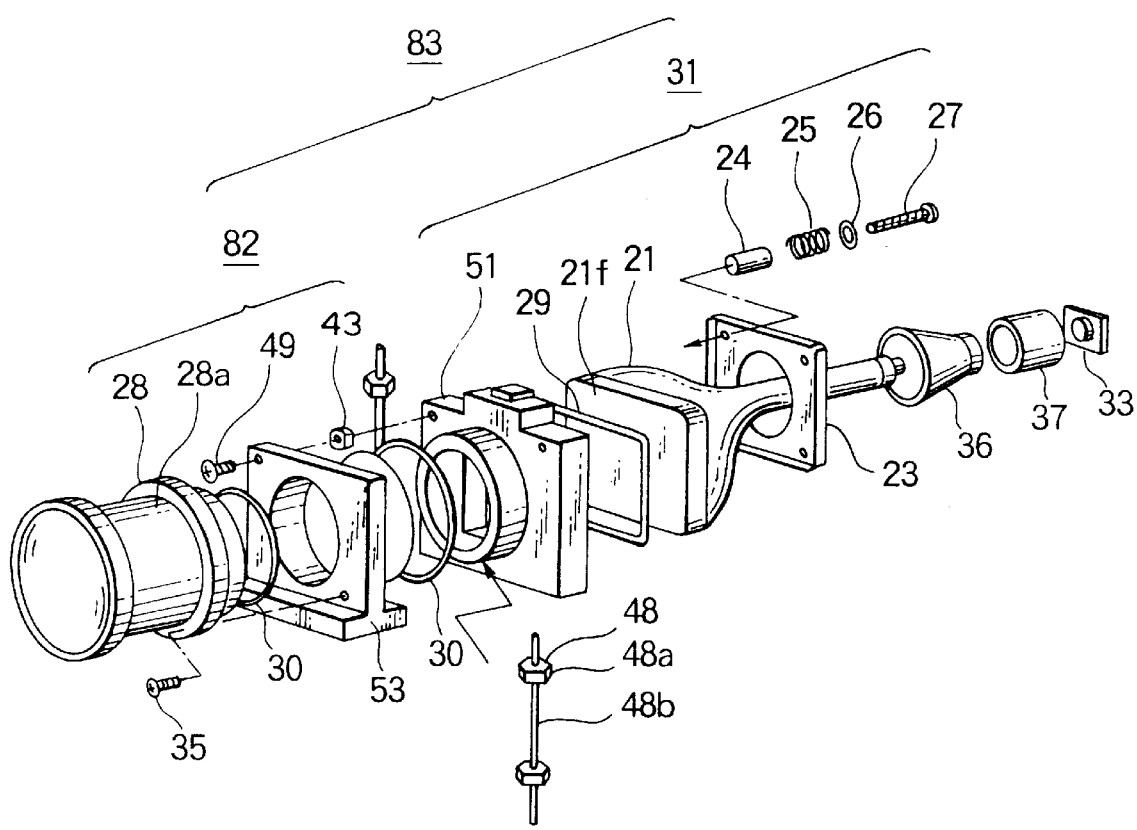
FIG. 3 is a perspective exploded view of the a projecting unit according to the first embodiment.
Figure 4:
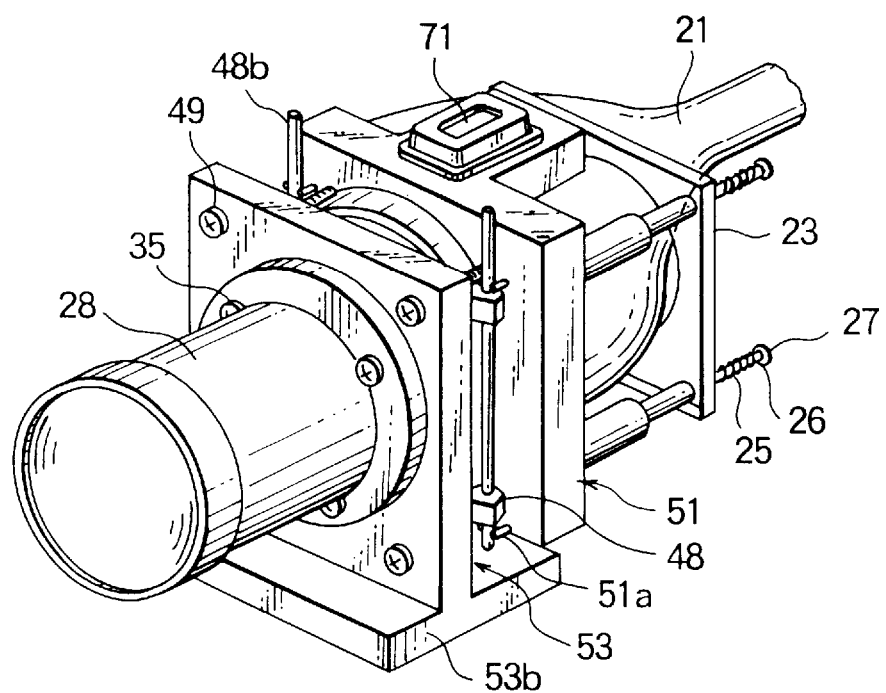
FIG. 4 is a perspective view showing the projecting unit according to the first embodiment, in the assembled state.
Figure 5:
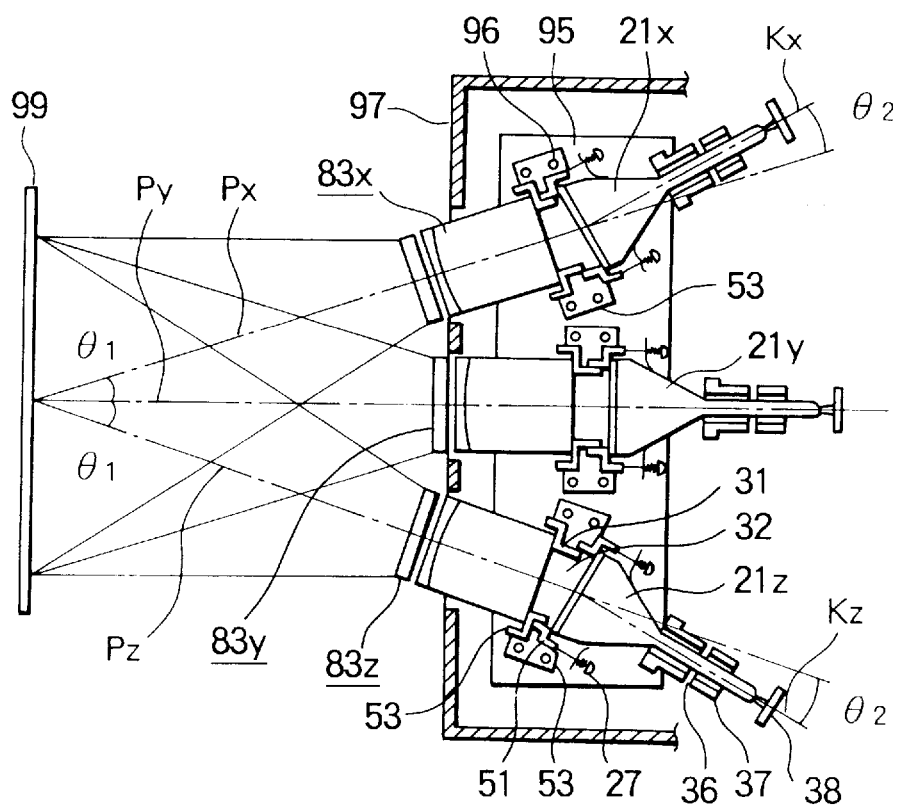
FIG. 5 is a schematic view, as seen from above, showing how three projecting units are installed.
Figure 6:
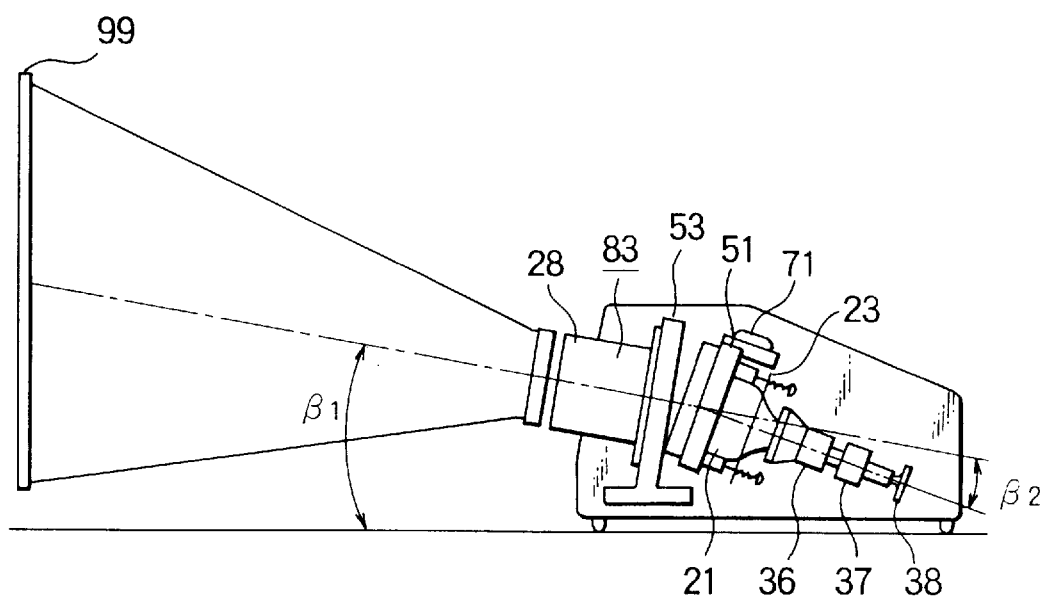
FIG. 6 is a side sectional view showing how the projecting unit is vertically aligned.

This invention will now be described with reference to the drawings. FIG. 1 is a vertical sectional view of a projecting unit of a projector according to a first embodiment of this invention. FIG. 2 is a horizontal sectional view of a projecting unit of a projector according to the first embodiment of this invention. FIG. 3 is a perspective view of parts of a projecting unit according to the first embodiment of this invention. FIG. 4 is a perspective view showing the assembled state of a projecting unit according to the first embodiment of this invention. FIG. 5 is a sectional view of the pertinent parts of three projecting units installed in a projector viewed from above. FIG. 6 is a sectional view from the side of a projector when the projector is projecting. In the figures, parts identical to those of the prior art are given the same symbols and their description is omitted.

An opening 51v through which projected light passes is formed in a projecting tube frame 51, and a projecting tube packing 29 is inserted in a groove 51m provided along the edge of the frame defining an opening 51v on the side of a projecting tube 21. The projecting tube 21 forms part of a block 81 which also includes a frame 51. The tube 21 is pressed by a press plate 23 by the force of springs 25 such that it is in sealing engagement with the packing 29.

The projecting lens 28 comprising a plurality of lens groups supported in a lens barrel 28a, a lens surface 28b nearest the projecting tube 21 is in sealing engagement with a lens packing 30 inserted in an annular groove 53m provided along the edge of a lens frame 53 defining an opening 53v, and a flange 28f of the lens barrel 28a is fixed by means of screws 35 so as to form a lens block 82.

As shown in FIG. 2, an outer surface of an annular part 53g encircling the opening 53v of the lens frame 53 is inserted in the inner surface of an annular part 51n encircling the opening 51v of the projecting tube frame 51. A slide packing member 50 such as an O-ring, for example, is inserted in a groove 53z provided on the outer surface of the annular part 53g of the lens frame 53 to function as a seal, so that the inner surface of the annular part 51n of the projecting tube frame 51 and the outer surface of the annular part 53g of the lens frame 53 are free to slide while maintaining fluid-tightness.

A cooling medium 32 is filled from an injection port 51d provided in the projecting tube frame 51 in a space 31 enclosed by the projecting tube 21, projecting lens 28, projecting tube frame 51 and lens frame 53. An injection port screw 74 is screwed in a tapped hole provided in the projecting tube frame 51, with an injection port packing 75 interposed between the injection port screw 74 and the projecting tube frame 51. The injection port screw 74 functions as a cap for preventing the cooling medium 32 from flowing out.

This cooling medium may for example be ethylene glycol or a silicone oil, its function being to transfer heat generated when the projector is operating from a face 21f of the projecting tube 21 to the projecting tube frame 51 and the lens frame 53, from which the heat is radiated outside. In addition, as it has the same refractive index as the glass of which the projecting tube 21 and projecting lens 28 are composed, it prevents light from returning to the fluorescent screen when light from the projecting tube 21 is incident on the projecting lens 28, and thereby prevents deterioration of contrast.

A diaphragm 71 fixed to a cover 72 absorbs, by its extension and shrinking, volume changes due to the expansion and contraction of the medium 32, both when the projector is operating and when it is not, so that the pressure inside the space 31 is maintained constant. This diaphragm 71 is sealingly fitted to the projecting tube frame 51 by means of a protrusion 71a surrounding the diaphragm.

The projecting tube 21 and projecting lens 28 are joined with a predetermined orientation by tightening bolts 49, and spacer units 48. Each of the spacer units 48 comprises a pair of spacers 48a and a shaft 48b connected to the spacers. That is, the spacers 48a are respectively positioned near top and bottom ends of the shaft 48b. Each of the spacers 48a is in the form of irregular hexagonal prism with three pairs of substantially parallel, opposite surfaces. The distance between and inclination of the opposite surfaces the differ from one pair to another. The distance between the opposite surfaces is sometimes called a "thickness." The shaft 48b is coaxially connected to the spacers 48a. The spacer units 48 are provided on the right and left sides of the frames, and the spacers 48a are positioned at the four corners, i.e., top-right, top-left, bottom-right and bottom-left. Each pair of the spacers 48a vertically aligned with each other are connected by a common shaft 48b. That is, the spacers 48a at the top-right and bottom-right corners are connected to a common shaft 48b, and the spacers 48a at the top-left and bottom-left corners are connected to a common shaft 48b.

When the projecting unit is assembled, the spacers 48a are held between and pressed by a flange 51f of the tube frame 51 and a flange 53f of a lens frame 53 as shown in FIG. 2 or FIG. 3.

The distance of the tube 21 from the lens 28, and its inclination relative to the lens 28, are determined by the selection of the pair of opposite surfaces of the spacers 48a.

In order to set the spacers 48a in predetermined positions between the frames, pins 51a are provided in parallel with each other and fixed to the tube frame 51 and the shafts 48b of the spacers 48 are inserted between these pins 51a, as shown in FIG. 4.

The tightening bolts 49 used to join the frames pass through throughholes 53k provided in the flanges 53f of the lens frame 53, and have thread parts (external thread parts) 49j screwed in or engagement with tapped parts (internal thread parts) 51j of the tube frame 51. Larger diameter parts 49d of the bolts 49 extend through the throughhole 53k in the flange 53f and are longer than the amount of change in the gap between the tube frame 51 and lens frame 53 due to adjustments, and nuts 43, which are separating contact members, are screwed onto the thread parts 49j, have a larger diameter than the larger-diameter parts 49d, and are engageable with the surface of the flange 53f as the tightening bolts 49 are loosened.

Next, the operation of this assembly will be described. It is well known that in an ordinary projector, three projecting units, i.e., red, green and blue, each comprising a projecting tube 21, projecting lens 28, projecting tube frame 51 and lens frame 53, are used in order to increase brightness as shown in FIG. 5. In this type of projector, projecting axes Px, Pz of projecting units 83x, 83z are inclined at a converging angle θ1 with respect to a projecting axis Py of a projecting unit 83y, so that the images formed by projecting tubes 21x, 21y, 21z coincide at one point on a screen 99. Further, tube axes Kx, Kz of the projecting tubes 21 are inclined at a compensating angle θ2 with respect to the projecting axes Px, Pz of the projecting units 83x, 83z on the both sides in order to adjust edge focusing at the periphery of the screen. Reference numeral 95 denotes a unit base to which the projecting units 83 are attached by means of screws 96 or the like, and 97 is an outer casing of the projector.

In this type of projector, however, if the screen size or set distances and angles are changed, the center and edge focusing must be adjusted by changing the aforesaid horizontal converging angle θ1, horizontal compensating angle θ2, vertical incident angle β1 and vertical compensating angle β2 (FIG. 6). The orientation of the projecting tube 21 relative to the projecting lens 28 is changed in the following manner.

The bolts 49 which join the tube frame 51 and lens frame 53 are loosened to enable the frames to slide. When the bolts start to loosen, the frames do not move because the slide packing member 50 is in rigid contact with the inner surface of the annular part 51n of the tube frame 51 and the groove 53z of the lens frame 53. Eventually, the nuts 43 which are screwed on the bolts 49 and which act as separators, come into contact with the flange 53f of the lens frame 53, and when the bolts are rotated further, the frames are pulled apart by the nuts 43. After the frames have separated to a predetermined spacing, the spacer units 48 are turned so that surfaces of the spacers 48a giving desired frame spacings face the flanges 51f, 53f of the frames, and the bolts 49 are then tightened, with the flanges 51f, 53f being brought into abutment with the opposite surfaces of the spacers 48a. As the frames are prevented from closing further by the spacers which are held between them, and prevented from opening further by the tapped parts 51j in the tube frame 51, the two frames are held in predetermined orientations.

Figure 7:
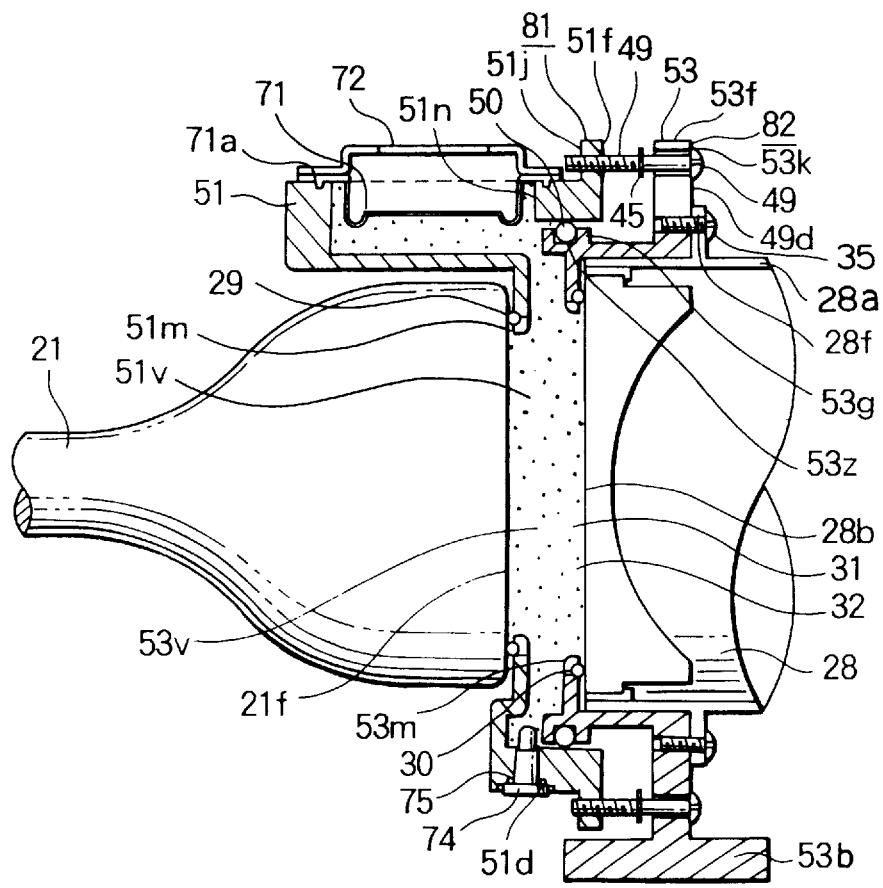
FIG. 7 is a sectional view of a modification of the first embodiment.
Figure 8:
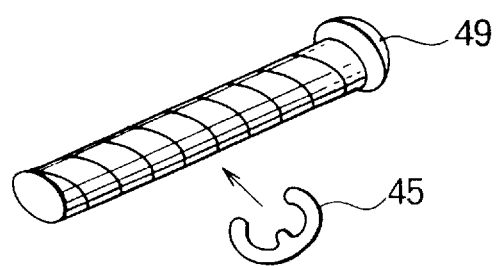
FIG. 8 is a perspective view of a screw used in the modification of FIG. 7.

FIG. 7 is a sectional view of a modification of the first embodiment, and FIG. 8 is a perspective view of its pertinent parts. In these figures, the same effect is obtained at low cost by using ordinary screws for the bolts 49, and setting snap rings 45 as separators at appropriate positions on the screws.

In place of the nuts 43 or snap rings 45, any other separating contact member having a projection (projecting radially outward of the axis of the tightening bolt) for engagement with the flange 53f as the tightening bolt is loosened may be used.

In the projecting unit of the projector according to the first embodiment, when it is desired to set the orientations of the projecting tube and projecting lens, the orientation of the tube block relative to the lens block can be changed as these blocks are free to slide relative to each other while maintaining fluid-tight seal, and when the projector comprises three projecting units, this arrangement can be applied to each unit, i.e., red, green and blue. As a result, the projecting unit of the projector according to this invention can be used with projecting devices of different types having different projecting distances and screen sizes, while the time required to design the conventional spacer frame and the cost of manufacturing the mold are reduced.

If the spacers determining the orientation of the projecting tube and projecting lens are formed of prisms having opposite faces with different separations, when the tightening bolts are loosened so as to increase the separation between the two frames, the spacers can be rotated and the bolts can then be tightened again. The orientation of the tube and lens can thus be easily changed while the projecting unit is still installed in the projector. Moreover, the operation can be performed from the top or the front of the unit, and is therefore facile.

Further, when it is desired to change the orientations of the projecting tube and projecting lens, the separation between the two frames can be increased by the separating contact members provided on the tightening bolts. The orientation of the tube relative to the lens can thus be easily be changed even when the slide packing members are kept in sealing contact with the frames.

Embodiment 2

Figure 9:
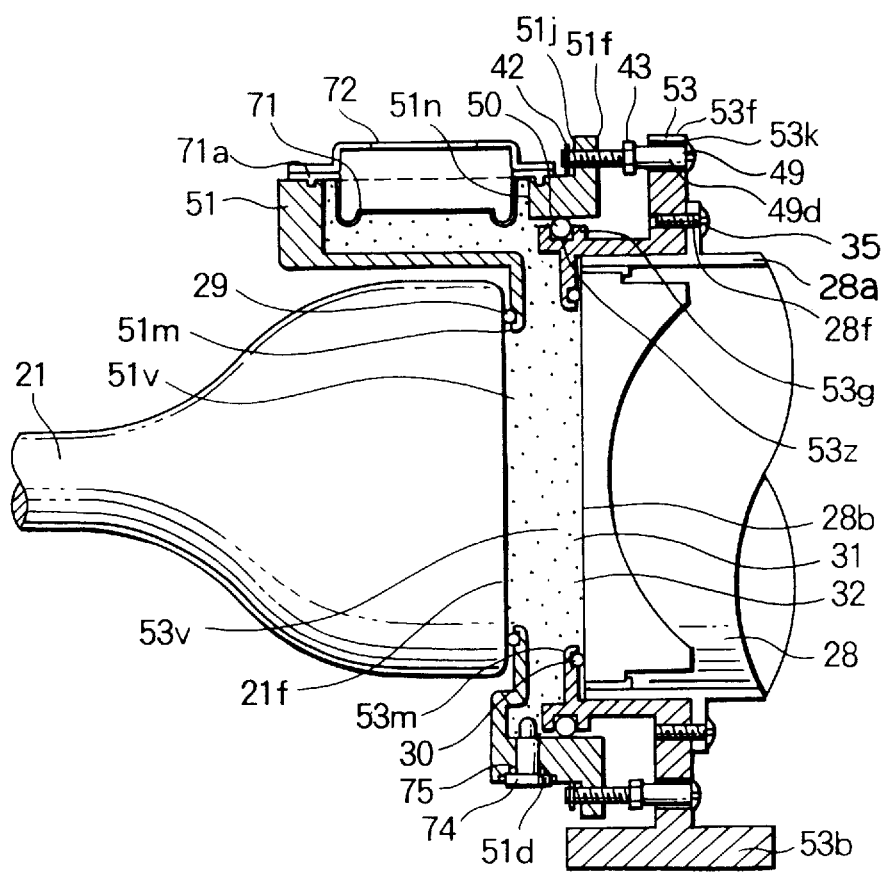
FIG. 9 is a vertical sectional view of a projecting unit according to a second embodiment of this invention.

FIG. 9 is a sectional view showing a projecting unit according to a second embodiment of this invention. In the figure, parts identical to those of the first embodiment are assigned the same symbols and their description is omitted.

In this embodiment, stoppers 42 are provided near the ends of the screw parts 49j of the bolts 49, and when the bolts 49 are rotated in such a direction as to pull them out, the stoppers 42 come into contact with the flange 51f so that they do not come off the tapped parts 51j. According to this embodiment, the stoppers 42 are snap rings mounted on the screw parts 49j of the bolts 49.

When the tightening bolts are loosened and the frames have separated to a predetermined spacing, the stoppers 42, which are installed on the screw ends of the bolts 49, come into contact with the flange 51f of the tube frame 51 so that the bolts 49 cannot be withdrawn any further. This prevents the lens frame 53 from becoming disengaged from the tube frame 51.

The rest of the configuration and the function are similar to those of the first embodiment.

Figure 10:
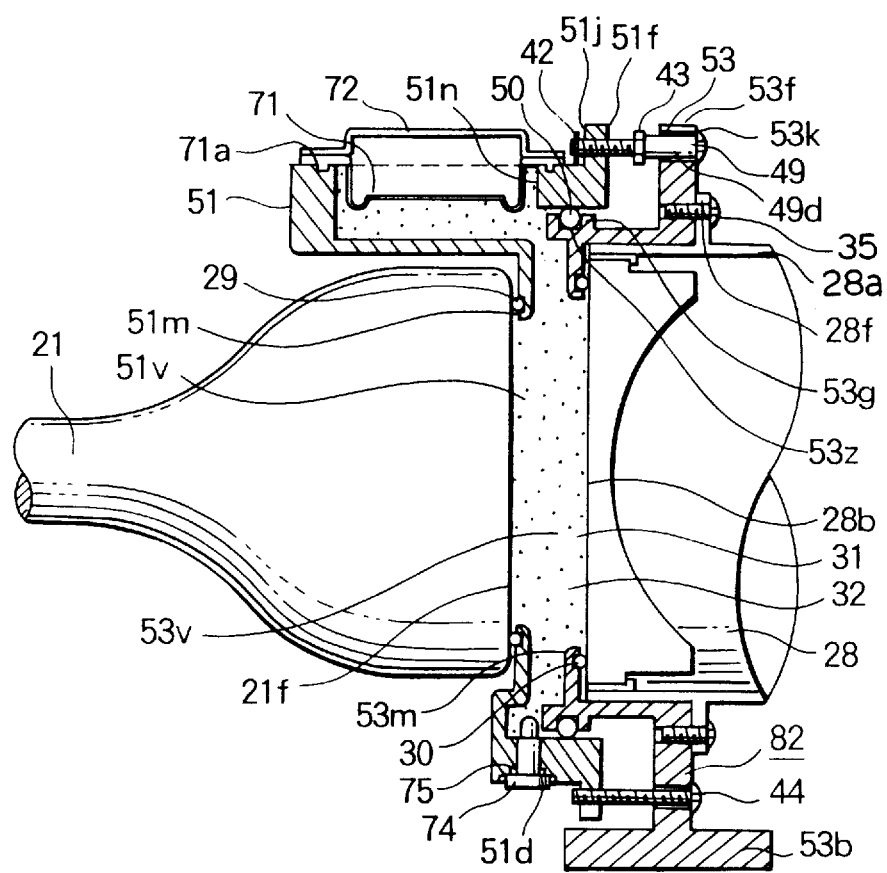
FIG. 10 is a vertical sectional view of a modification of the second embodiment.

FIG. 10 is a sectional view of a modification of the second embodiment. In the figure, parts which are the same as those of the second embodiment are given the same symbols and their description is omitted.

A difference is that only two of the bolts 49 are used for fixing the upper parts of the frames, while two ordinary screws 44 are used in place of the bolts 49 for fixing the lower parts. This gives the same effect, but allows the two frames to be joined at lower cost.

In the projecting unit of the projector according to the second embodiment, the stoppers provided in the vicinity of the ends of the tightening bolts come into contact with the frame, so there is no risk of the bolts falling out of the frame or the inter-frame spacing increasing beyond a predetermined amount. Consequently, there is no risk of liquid leaking.

Embodiment 3

Figure 11:
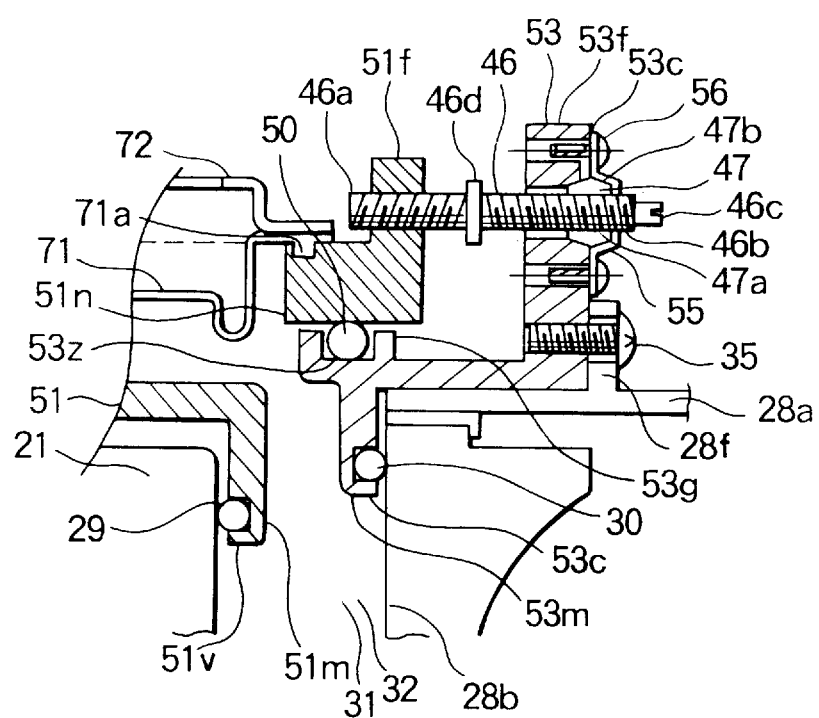
FIG. 11 is a sectional view of a part of a projecting unit according to a third embodiment of this invention.

FIG. 11 is a sectional view of a projecting unit of a projector according to a third embodiment of this invention. In the figure, parts identical to those of the first embodiment are assigned the same symbols and their description is omitted.

Compound screw bolts 46 each having a right-hand thread part 46a and a left-hand thread part 46b on the respective sides of a central part 46d and having shafts 46c at one end, are provided at predetermined positions for joining the two frames. The right-hand thread parts 46a screw into the tube frame 51 and the left-hand thread parts 46b screw into tapped members 47. These tapped members 47 include circumferential surfaces 47b that are spherical surfaces around a certain point on the axis of the internal thread parts 47a screwed onto the compound screw bolts 46, and are installed such that they are free to turn between chamfers 53c of the lens frame 53 and holders 55 attached to the lens frame 53 by means of screws 56.

When it is desired to change the orientations of the tube 21 and lens 28, the shafts 46c at the ends of the compound screw bolts 46 are engaged by an appropriate turning tool, and turned, and the tube frame 51 and lens frame 53 move in directions tending to separate from one another as there are thread parts of opposite hands at both ends. At this time, the lens frame 53 is supported such that the tapped members 47 can turn inside the chamfers 53c and holders 55 so that there is no obstruction even if the tube frame 51 inclines relative to the lens frame 53. After the frames have separated to a predetermined spacing, spacer units, not shown, are turned so that surfaces of the spacers 48a giving desired frame spacings are face the flanges 51f, 53f of the frames as in the first embodiment, and the compound screw bolts 46 are then tightened, with the flanges 51f, 53f being brought into abutment with the opposite surfaces of the spacers 48a.

The rest of the configuration and the function are similar to those of the first embodiment.

In the projecting unit of the projector according to the third embodiment, the two ends of the tightening bolts screw into tapped parts formed in opposite hands. Hence, when it is desired to change the orientations of the projecting tube and projecting lens, and to increase or decrease the inter-frame spacing, these bolts can be turned so as to forcibly separate or bring the frames closer together while the slide packing members are kept in sealing engagement with the frames. Hence, the orientation of the tube relative to the lens can be changed in a short time.

Further, as the two frames are tightened by screws, the inter-frame spacing is determined by the amount dependent on pitches of the screws and the number of turns of the screws, so the orientations of the frames can be set with high precision.

Embodiment 4

Figure 12:
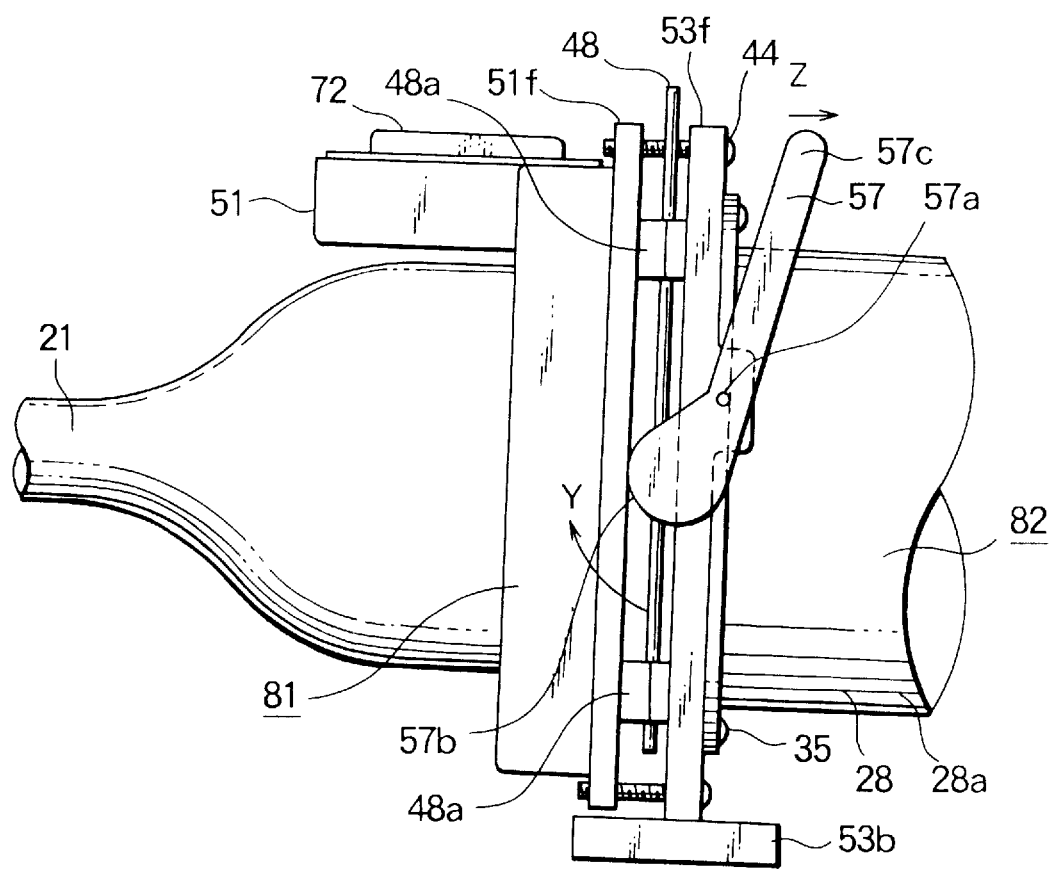
FIG. 12 is a side view of a tightening/separating screw and its associate parts of a projecting unit according to a fourth embodiment of this invention.

FIG. 12 is a drawing of a projecting unit of projector according to a fourth embodiment of this invention. In the figure, parts identical to those of the first embodiment are assigned the same symbols and their description is omitted.

The tube frame 51 and lens frame 53 are joined by screws 44 with spacer units 48 of predetermined thicknesses interposed and pressed between the frames as in the first embodiment. A lever 57 rotates about an pivot axis 57a on the flange 53f of the lens frame 53. The lever 57 has an engaging end 57b that is engageable with the flange 51f of the tube frame 51 at a position beneath the pivot axis 57a, and a handle 57c at an end opposite to the engaging end 57b. The engaging end 57b serves as a cam and the flange 51f serves as a cam follower.

When it is desired to change the orientations of the projecting tube 21 and projecting lens 28, the screws 44 joining the tube frame 51 and lens frame 53 are loosened to enable the two frames to slide. Although the screws 44 are loosened, the frames do not move because the slide packing member, not shown, is in rigid contact with the tube frame 51 and the lens frame 53 as in the first embodiment. When the handle 57c of the lever 57 which pivots on the lens frame 53 is turned in the Z direction, the engaging end 57b moves in the Y direction so that the tube frame 51 is pushed away.

After the two frames have separated to a predetermined spacing, the spacer units 48 are turned so that surfaces of the spacers 48a giving desired frame spacings come into contact with the flanges 51f, 53f of the two frames, and the screws 44 are tightened to fix the assembly as in the first embodiment, with the surfaces of the spacers 48a giving the desired frame spacings being in abutment with the flanges.

The rest of the configuration and the function are similar to those of the first embodiment.

Figure 13:
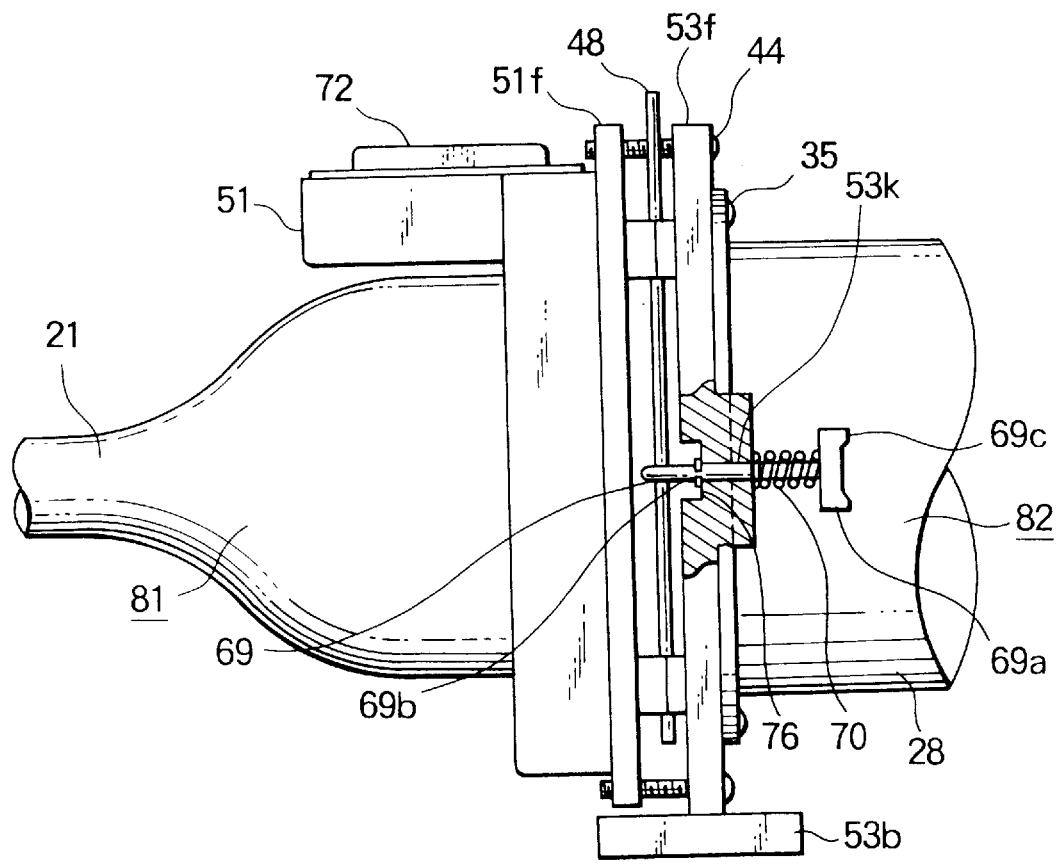
FIG. 13 is a side view, partially in section, of a modification of the fourth embodiment.

FIG. 13 is a side view of a modification of the fourth embodiment. In the figure, parts which are the same as those of the fourth embodiment are assigned the same symbols, and their description is omitted here. The constructions of the tube block 81 wherein the tube 21 is sealingly attached to the tube frame 51, and of the lens block 82 wherein the lens 28 is sealingly attached to the lens frame 53 are the same as those in the fourth embodiment.

The construction whereby orientations are determined by interposing the spacers 48a between the frames, is also the same as in the fourth embodiment. In this modification however, a separating rod 69 extends through a throughhole 53k provided on the lens frame 53, and a tip of the rod 69 is engageable with the tube frame 51. A compression spring 70 is fitted between a head 69a of the rod 69 and the flange 53f of the lens frame 53, while on the other side of the flange, a snap ring 76 is fixed on the rod 69 in a hollow 69b of the flange 53f to prevent the rod 69 from falling out. An engagement part 69c is formed on the head 69a so that it can engage easily with a pushing tool, not shown. For separating the frames 51 and 53 apart, the rod 69 is pushed leftward as seen in FIG. 13, by the use of a pushing tool engaging the engagement part 69c, after the bolts 59 are loosened. This construction wherein the inter-frame spacing is forcibly widened by the rod 69 has the same effect as in the preceding embodiments.

Figure 14:
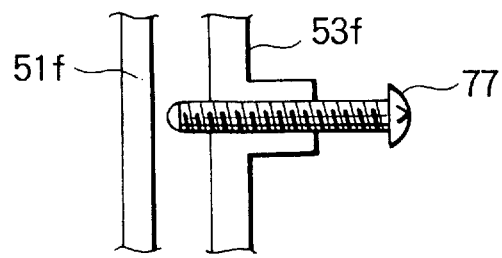
FIG. 14 is a sectional view of a separating screw and its associated part of another modification of the fourth embodiment.

FIG. 14 is a sectional view of the pertinent parts of another modification of the fourth embodiment. In the figure, the same effect is obtained at lower cost by a construction wherein the tip of a separating screw 77 that screws into the flange 53f of the lens frame 53, has its tip in contact with the flange 51f of the tube frame 51.

By providing the levers 57, separating rod 69 or separating screws 77 on both the left and right of the flange 53f, the two frames 51, 53 can easily be separated without the application of excessive force to the frames.

In the projecting unit of the projector according to the fourth embodiment, when it is desired to change the orientations of the projecting tube and projecting lens, the two frames can easily be separated by a small force by means of a separating member, such as a lever, a separating rod or screw, that is separate from the tightening members fixing the two frames. Moreover, a force can be applied to the frames near their centers via an end of the lever, or the tip of the rod or screw, so the frames are pulled together or pushed apart over their whole area and can be separated without applying excessive force.

Embodiment 5

Figure 15:
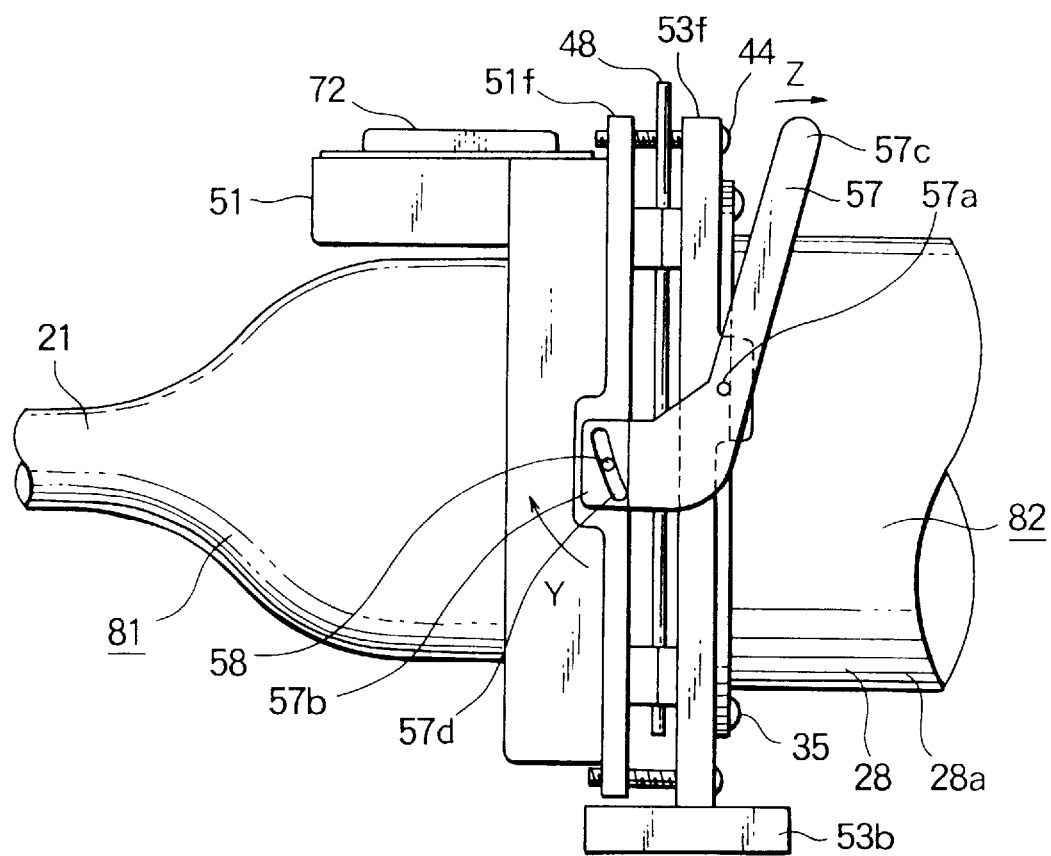
FIG. 15 is a side view of a projecting unit according to a fifth embodiment of this invention.

FIG. 15 is a side view of a projecting unit of a projector according to a fifth embodiment of this invention. In the figure, parts identical to those of the first embodiment are assigned the same symbols and their description is omitted.

The tube frame 51 and lens frame 53 are joined by the screws 44 with the spacers 48a of predetermined thicknesses interposed between the frames as in the first embodiment. The lever 57 rotates about the pivot axis 57a on the flange 53f of the lens frame 53. The lever 57 has an engaging end 57b having a guide groove 57d engaging with a pin 58 implanted in or fixed to the flange 51f of the tube frame 51. This engaging end 57b is located beneath the pivot axis 57a. The lever 57 also has a handle 57c on the end opposite to the engaging end 57b. As the lever is rotated in the Z direction, the pin 58 and hence the tube frame 51 is pushed leftward as seen in FIG. 15 so that the frames 51 and 53 are separated. As the lever is rotated in the direction opposite to the direction Z, the pin 58 and hence the tube frame 51 is pushed rightward as seen in FIG. 15 so that the frames 51 and 53 are brought toward each other.

When it is desired to change the orientations of the projecting tube 21 and projecting lens 28, the screws 44 joining the tube frame 51 and lens frame 53 are loosened to enable the two frames to slide. When the screws start to be loosened, the frames do not move because the slide packing member, not shown, is in rigid contact with the tube frame 51 and the lens frame 53, as in the first embodiment. When the handle 57c of the lever 57 which pivots on the lens frame 53 is turned in the Z direction, the engaging end 57b rotates in the Y direction, a force acts on the pin 58 engaged with the guide groove 57d, and the tube frame 51 is pushed away.

After the two frames have separated to a predetermined spacing, the spacer units 48 are rotated so that when the lever 57 is rotated in a direction reverse to the Z direction, surfaces of the spacers 48a giving desired frame spacings come into contact with the flanges 51f, 53f of the two frames. The screws 44 are then tightened to fix the assembly as in the first embodiment.

The rest of the configuration and the function are similar to those of the first embodiment.

In the projecting unit according to the fifth embodiment, when it is desired to change the orientations of the projecting tube and projecting lens, the two frames can easily be moved by a small force either in a direction tending to separate them or a direction tending to bring them together by means of the lever and the combination of the guide groove and the pin which are separate from the tightening means that fixes the two frames together. Moreover, as the frames can be moved by simultaneously applying forces to the left and right in the vicinity of the frame center, they can be separated without applying excessive force.

Embodiment 6

Figure 16:
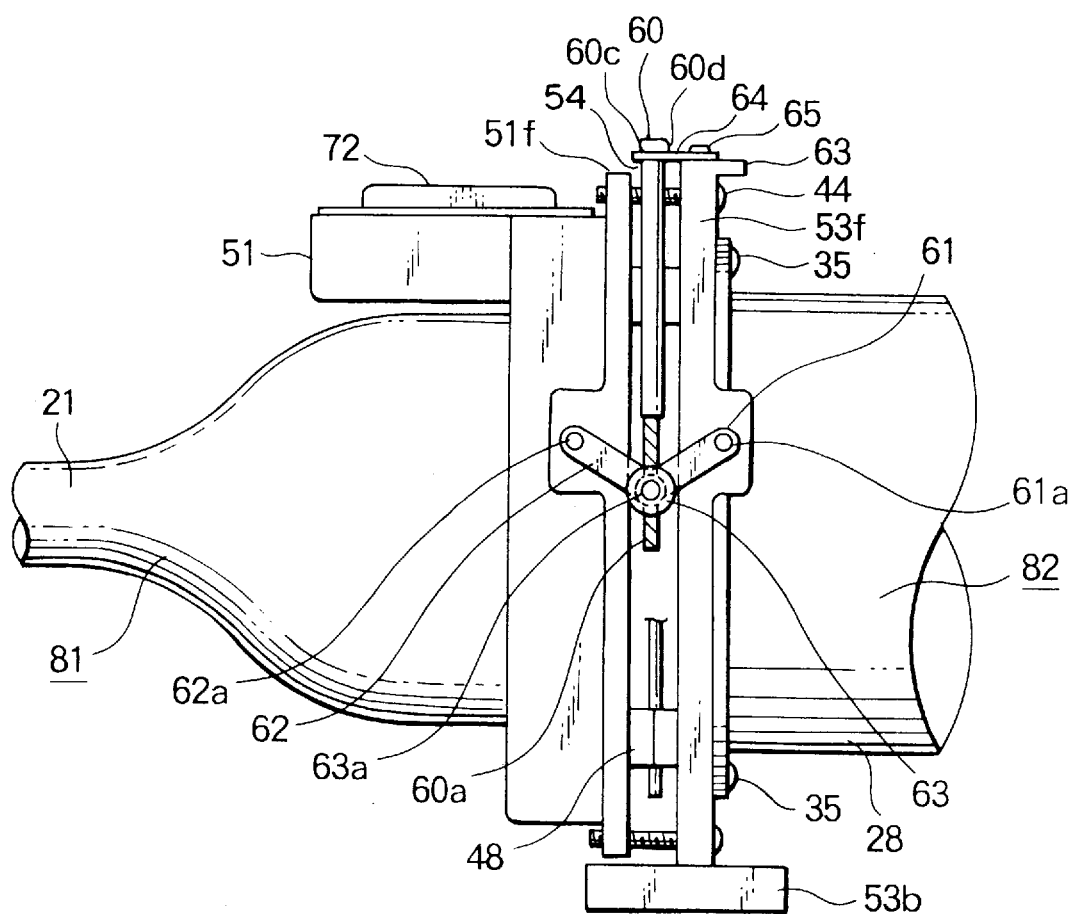
FIG. 16 is a side view of a projecting unit according to a sixth embodiment of this invention.

FIG. 16 is a side view of a projecting unit of a projector according to a sixth embodiment of this invention. In the figure, parts identical to those of the first embodiment are assigned the same symbols and their description is omitted.

The tube frame 51 and lens frame 53 are joined by the screws 44, the spacers 48a having predetermined thicknesses being interposed between the frames as in the first embodiment. A first link 61 has a first end rotatably coupled at an pivot axis 61a to the flange 53f of the lens frame 53. A second link 62 has a first end rotatably coupled at a pivot axis 62a to the flange 51f of the tube frame 51. The first and second links 61 and 62 have second ends rotatably coupled with a coupling piece 63. The links 61 and 62 in combination form a toggle joint.

An adjusting screw 60 is installed on a holding piece 64 fixed by a screw 65 to the lens frame 53, this screw 60 having a thread part 60a at its end that screws into a tapped part 63a provided in the coupling piece 63. A snap ring 54 is fitted in a depression 60d formed near a head 60c of the adjusting screw 60 so that the adjusting screw 60 is free to turn but is prevented from moving axially.

When it is desired to change the orientations of the projecting tube 21 and projecting lens 28, the screws 44 joining the tube frame 51 and lens frame 53 are loosened. Loosening the screws however may not be sufficient for the frames to move because the slide packing member, not shown, is in rigid contact with the tube frame 51 and the lens frame 53, as in the first embodiment. When the adjusting screw 60 held in the lens frame 53 by the holding piece 64 is turned in one direction, the coupling piece 63 that screws on the thread part 60a of the adjusting screw 60 moves upwards, and force is thereby applied to the lens frame 53 and tube frame 51 via the first and second links 61 and 62 which are free to pivot on the coupling piece 63, so that the two frames move apart. After the two frames have separated to a predetermined spacing, the spacer units 48 are turned so that surfaces of the spacers 48a giving desired frame spacings face each other, and when the adjusting screw 60 is turned in a reverse direction, the coupling piece 63 moves downwards, and the flanges 51f, 53f come into contact with the spacers. As the frames are prevented from closing further by the spacers 48a which are pressed between them, and prevented from opening further by the screws 44 of the tube frame 51, the two frames are held in predetermined orientations.

The rest of the configuration and the function are similar to those of the first embodiment.

Figure 17:
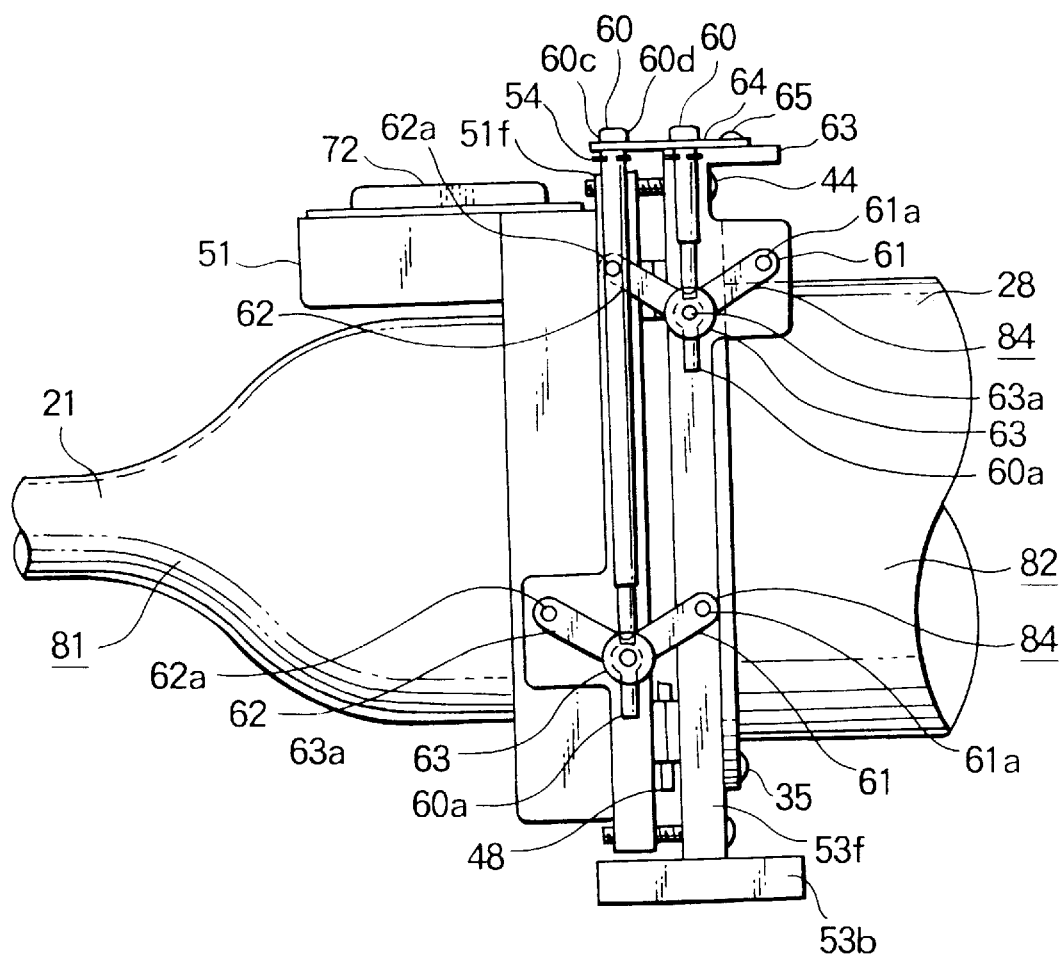
FIG. 17 is a side view of a modification of the sixth embodiment.

FIG. 17 is a side view of a modification of the sixth embodiment. In the figure, parts which are the same as those of the sixth embodiment are assigned the same symbols, and their description is omitted.

The construction wherein orientations of the projecting tube 21 and projecting lens 28 are determined by the spacers 48a between the frames, is also the same as in the first embodiment. Also, the same effect may be obtained by providing an opening/closing link mechanism 84 comprising the first and second links 61 and 62, coupling piece 63 and adjusting screw 60 at each of the upper and lower locations on each side of the projecting unit 83, and adjustment at the four positions (top-left, top-right, bottom-left and bottom-right positions) can be performed independently.

Figure 18:
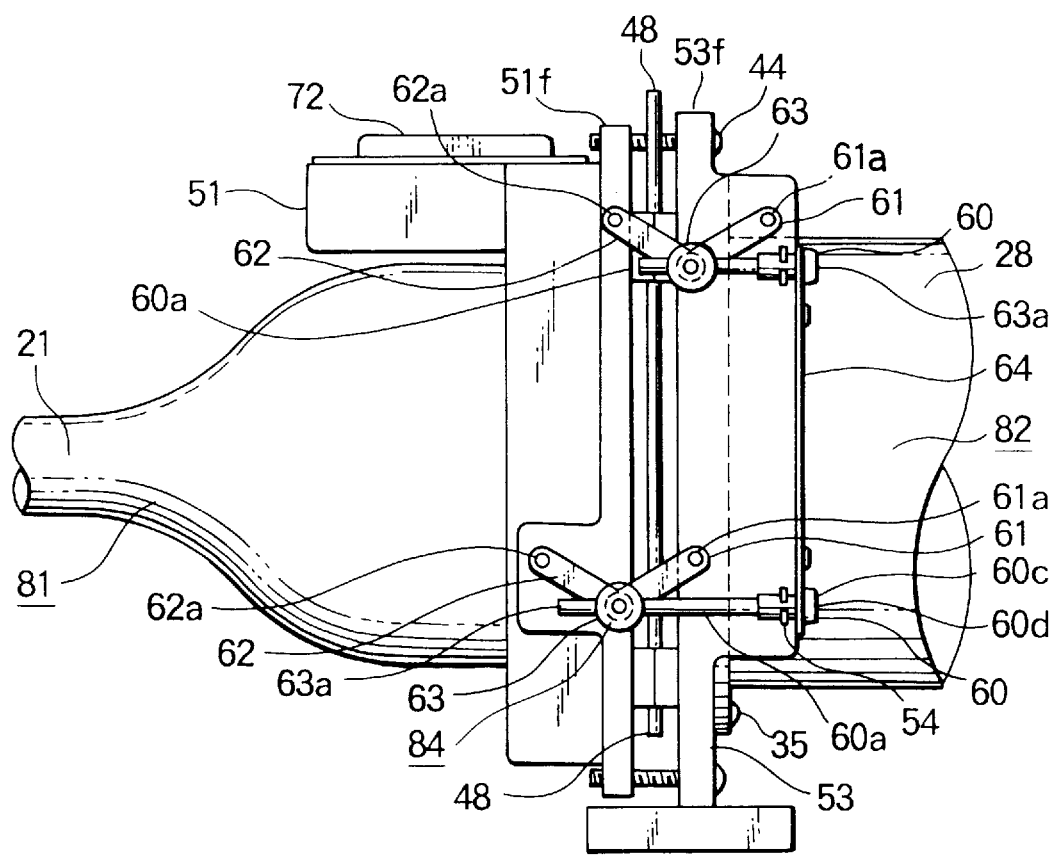
FIG. 18 is a side view of another modification of the sixth embodiment.

FIG. 18 is a side view of another modification of the sixth embodiment. In the figure, the provision of the opening/closing link mechanisms 84 each comprising the first link 61, second link 62, coupling piece 63 and adjusting screw 60 at four locations on the sides of the projecting unit 83 is the same as in the arrangement of FIG. 17, but the holding piece 64 is attached to the front surface of the lens frame 53 and the adjusting screws 60 are arranged to extend horizontally. The assembly may be opened and closed by turning the adjusting screw by engagement of a screw driver, for example, from the front of the lens 28.

In the projecting unit of the projector according to the sixth embodiment, therefore, when it is desired to change the orientations of the tube and lens, the two frames can easily be moved by a small force by the toggle-joint link mechanism separate from the tightening members that fix the two frames together, and by the adjusting screws that adjust the spacing between the frames via this link mechanism.

As the two frames are brought toward each other by the adjusting screw via the link mechanism, the inter-frame spacing is determined by the pitches of the screws and the number of turns of the screws, so their orientations can be set with high precision.

If opening/closing link mechanisms comprising toggle-joint link mechanisms and adjusting screws are disposed to the left and right, and on the top and bottom, of the two frames, distances at the respective points can be adjusted independently of each other, and the orientation precision of the projecting tube and projecting lens is improved.

Embodiment 7

Figure 19:
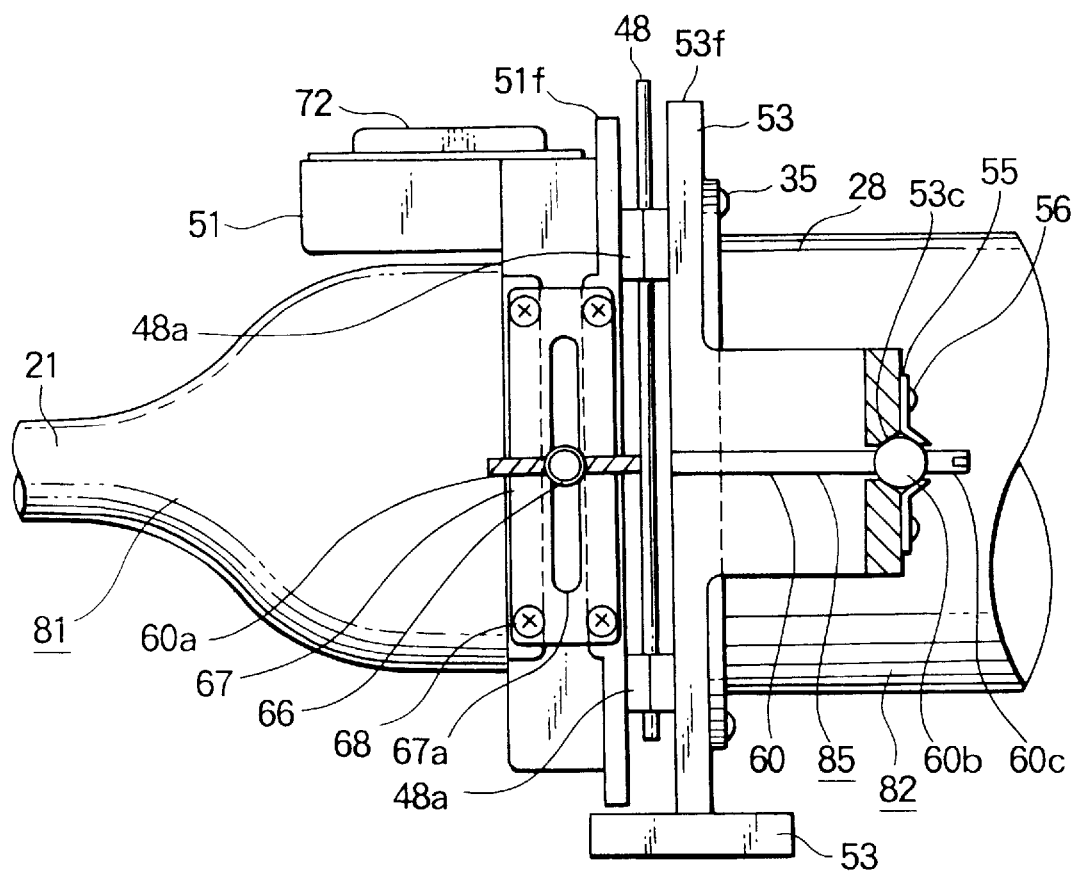
FIG. 19 is a side view, partially in section, of a projecting unit according to a seventh embodiment of this invention.
Figure 20:
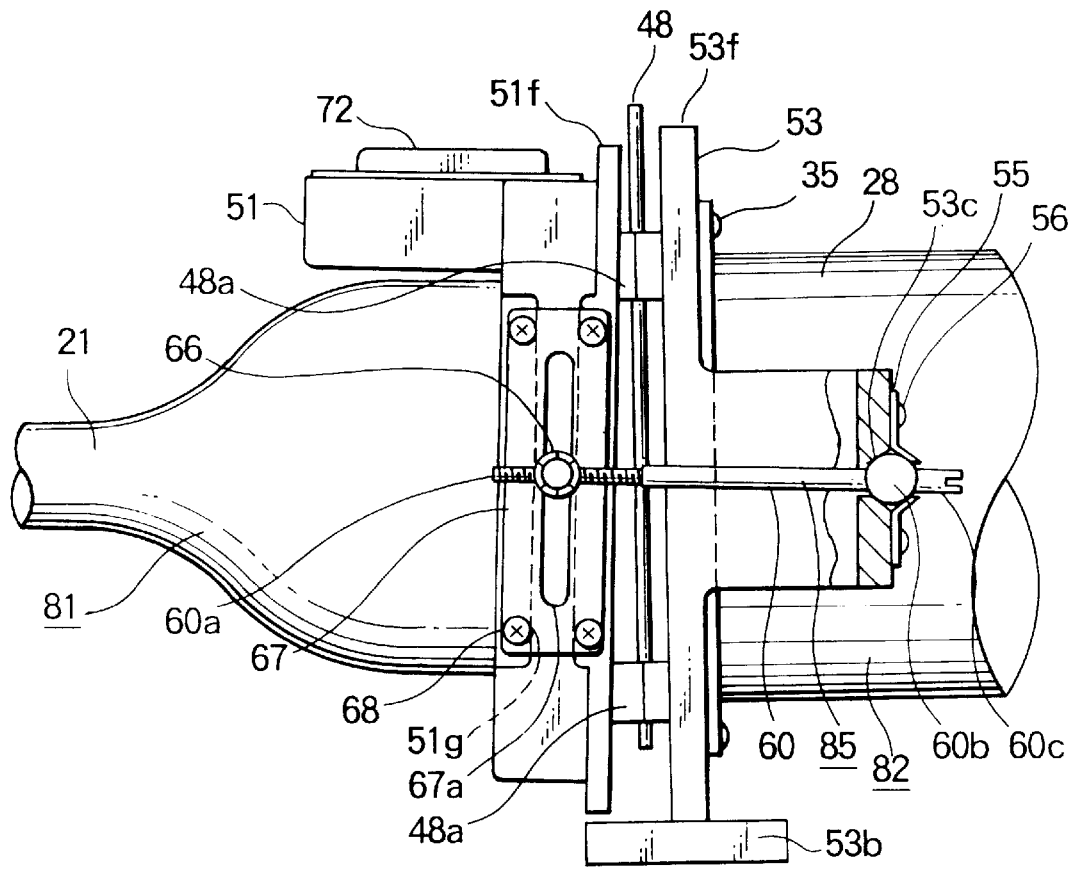
FIG. 20 is a side view, partially in section, of the projecting unit of the seventh embodiment, in a state in which the projecting tube is inclined relative to the projecting lens.
Figure 21:
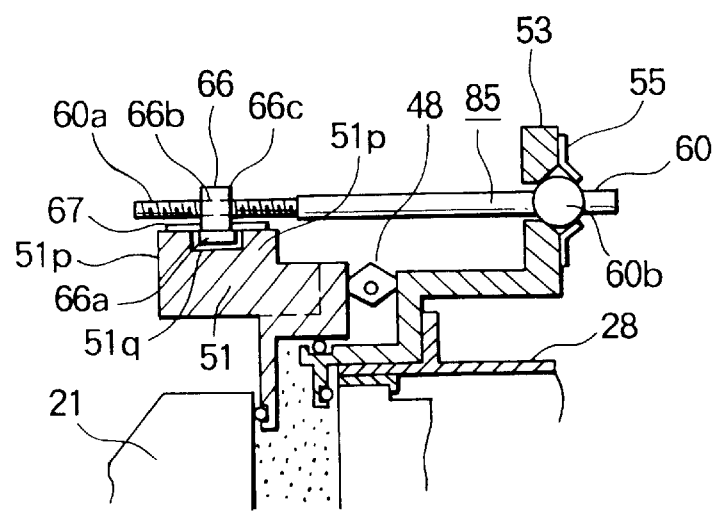
FIG. 21 is a sectional view of a tightening/separating screw and its associated parts of a projecting unit according to the seventh embodiment of this invention.

FIG. 19 and FIG. 20 are partially sectional side views of a projecting unit of a projector according to a seventh embodiment of this invention. FIG. 19 and FIG. 20 are different orientations. FIG. 21 is a sectional view of a pertinent parts of the assembly. In the figures, parts identical to those of the first embodiment are assigned the same symbols and their description is omitted.

As in the first embodiment, the inter-frame spacing is determined by the spacers 48a of predetermined thicknesses between the tube frame 51 and lens frame 53, however the adjusting screws 60 described below are used to join the frames. Each of the adjusting screws 60 of this embodiment has a thread part 60a toward a first end, a spherical member 60b at or near the other end, and an engagement part 60c at the second end of the adjusting screw 60 for engagement with a screw driver, for example. An elongated recess 51q is formed between two projections 51p of the tube frame 51, a plate 67 being fixed to these projections 51p by means of screws 68. An elongated hole 67a, serving as a guide groove, is provided in this plate 67 in alignment with the recess 51q and having a smaller width than the elongated recess 51q, so that an elongated cavity defined by the recess 51q and the plate 67 with the elongated opening 67a is formed. A slider 66 has a cylindrical sliding piece 66c having a tapped hole 66b extending at right angles with the axis of the cylindrical sliding piece 66c. The tapped hole 66b is screwed on the thread part 60a of the adjusting screw 60. The cylindrical sliding piece 66c extends through the elongated hole 67a, so that the sliding piece 66c is free to move along the length of the elongated hole 67a. A flange 66a connected to the tip of the cylindrical slider piece 66c engages with the inner surface of the plate 67 and is prevented from getting out of the elongated cavity.

The spherical member 60b of the adjusting screw 60 is free to rotate in space defined by a chamfer 53c of the lens frame 53 and a holder 55 attached by screws 56 to the lens frame 53, so as to allow rotation of the adjusting screw 60 about an axis normal to the page of FIG. 19 or FIG. 20 as the cylindrical sliding piece 66c slides along the elongated hole 67a.

Opening/closing units 85 each comprising the adjusting screw 60, slider 66, plate 67 and holder 55 are disposed on both sides of the lens frame 53.

When it is desired to change the orientations of the projecting tube 21 and projecting lens 28, the adjusting screw 60 attached to the lens frame 53 by the holder 55 is turned by the use of a screw driver, not shown, engaging with the engagement part 60c, and the slider 66 that screws on the thread part 60a of the adjusting screw 60 is moved leftward as seen in FIG. 19 and FIG. 20, so as to separate the two frames. After the two frames have separated to a predetermined spacing, the spacer units 48 are rotated so that as the adjusting screw 60 is turned in a reverse direction the surfaces of the spacers 48a giving desired frame spacings come into contact with the flanges 51f, 53f.

When the adjusting screw 60 is turned in the reverse direction, the slider 66 moves rightward as seen in FIG. 19 and FIG. 20, so that the tube frame 51 and lens frame 53 are pulled together. If for instance the selected thickness (the distance between the opposite pair of surfaces selected for engagement with the flanges 51f and 53f) of the lower spacer 48a is larger than the thickness of the upper spacer 48a, the flanges 51f and 53f come into contact with the lower spacer 48a first. As the adjusting screw 60 is turned further, the slider 66 tends to move rightward further, the tube frame 51 is rotated clockwise as seen in FIG. 19 and FIG. 20, about the point at which it is in contact with the lower spacer 48a, and the tube frame 51 is tilted relative to the lens frame 53, as shown in FIG. 20, and at the same time, the tube frame 51, the slider 66 slides upward along the elongated hole 67a.

When the tube frame 51 and the lens frame 53 are in contact with the upper spacer 48a, the rotation is terminated and the frames 51 and 53 are firmly secured. That is, the spacers 48a interposed between the two frames prevent the frames from closing while the adjusting screw 60 prevents them from opening, and the two frames are therefore fixed in predetermined orientations.

The rest of the configuration and the function are similar to those of the first embodiment.

In the projecting unit of the projector according to the seventh embodiment, the inter-frame spacing can be adjusted by the use of a combination of the plate member, the adjusting screw and the slider, on each side of the frames, and by turning two adjusting screws respectively disposed to the left and right. The time required for changing the orientation of the projecting tube and projecting lens is thereby shortened and assembly is made easier. Further, as the fixing positions of the frames are adjusted by these screws, the frames can be tightened with a uniform force, the stress acting on the frames is reduced, and the risk of breaking the frames is lessened.

Embodiment 8

Figure 22:
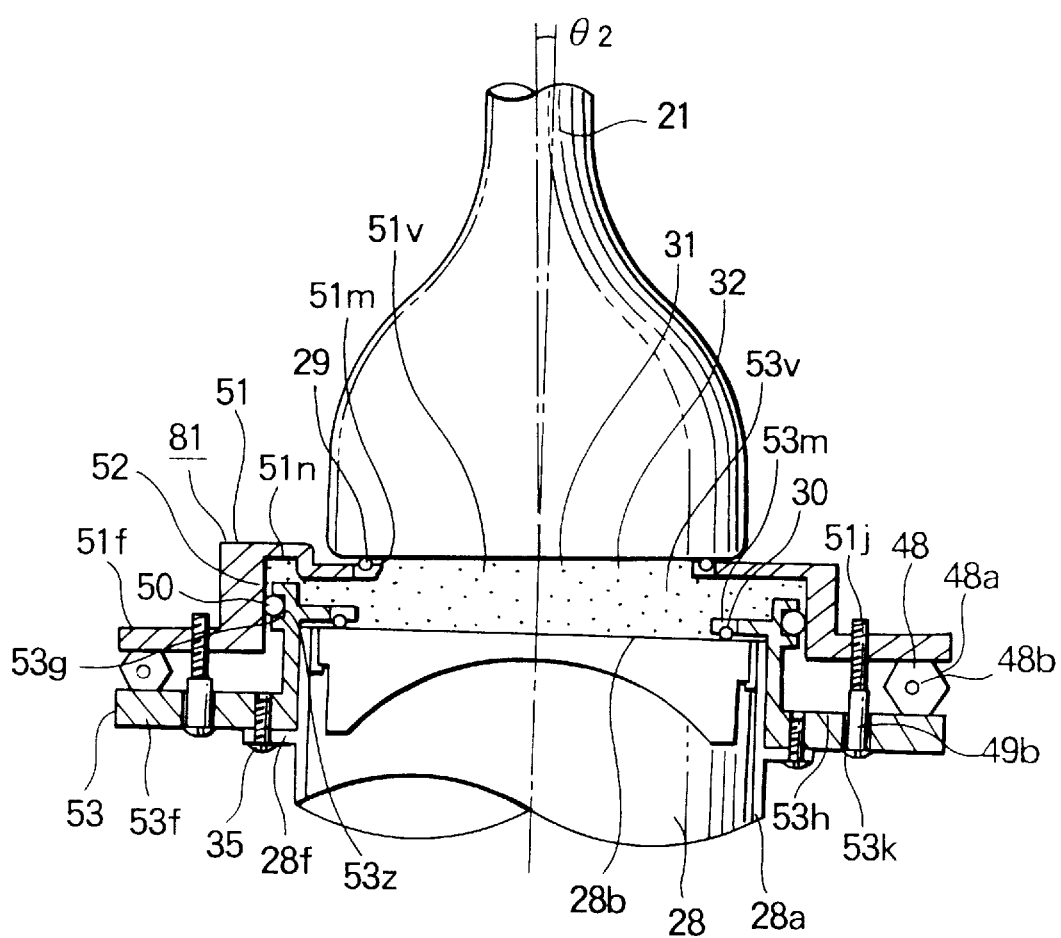
FIG. 22 is a sectional view, as seen from above, of a projecting unit according to an eighth embodiment of this invention.

FIG. 22 is a horizontal section through a projecting unit of a projector according to an eighth embodiment of this invention. In the figure, parts identical to those of the first embodiment are assigned the same symbols and their description is omitted.

According to this embodiment a grease 52 coated on the surface of the slide packing member 50. This grease 52 is insoluble in the cooling medium 32.

When the frames are moved relative to each other, either for setting the projecting unit for use, or for changing the spacing and orientation between the tube and lens units, the frames, particularly the inner surface of the annular part 51n of the tube frame 51 and the groove 53z of the lens frame 53, have to slide against the slide packing member 50, as described above. In this embodiment, as the surface of the slide packing member 50 is coated with the grease 52 so that the sliding resistance between the inner surface of the annular part 51n of the tube frame 51 and the groove 53z of the lens frame 53 is decreased, and the frames move smoothly.

According to this embodiment, the slide packing member 50 was coated with grease. However, the same effect is obtained by coating the inner surface of the annular part 51n of the tube frame 51 and the outer surface of the annular part 53g of the lens frame 53 with grease.

Other materials that reduce sliding frictional resistance may also be applied instead of grease.

In the projecting unit of the projector according to the eighth embodiment, when it is desired to change the orientations of the projecting tube and projecting lens, even if the compression ratio of slide packing members for maintaining fluid-tightness is set to be large, the two frames can easily be moved by a small force since slide frictional resistance is reduced using a lubricant such as grease coated on their surfaces.

Embodiment 9

Figure 23:
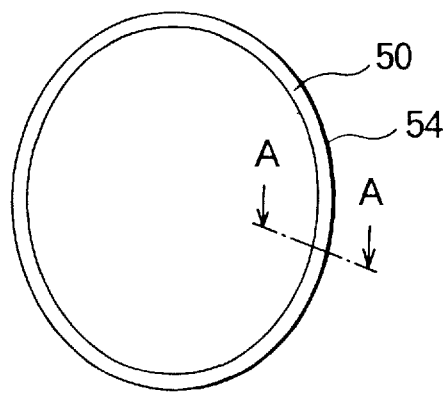
FIG. 23 is a perspective view of a slide packing member according to a ninth embodiment of this invention.
Figure 24:
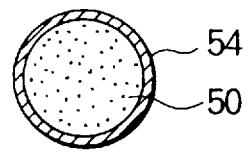
FIG. 24 is a cross sectional view of the slide packing member of FIG. 23.

FIG. 23 is a perspective view of a slide packing member 50 used in a projecting unit of a projector according to a ninth embodiment of this invention. FIG. 24 is a sectional view of the member showing a section A—A. In the figures, parts identical to those of the eighth embodiment are assigned the same symbols and their description is omitted.

The surface of the slide packing member 50 interposed between the inner surface of the annular part 51n of the tube frame 51 and the outer surface of the annular part 53g of the lens frame 53 in FIG. 1 and FIG. 2, is coated with a coating layer 54 of a fluoride material as shown in FIG. 23 and FIG. 24.

When it is desired to change the orientations of the lens 28 and tube 21, the bolts 49 connecting the tube frame 51 and lens frame 53 are loosened so that the two frames are free to move. Subsequently, the spacer units 48 are rotated so that surfaces of the spacers 48a giving a desired frame interval face the flange 51f of the tube frame 51 and the flange 53f of the lens frame 53, and the bolts 49 are again tightened so as to fix the assembly in position. In this process, the sliding frictional resistance between the two frames is reduced so that they can slide smoothly due to the coating of fluoride material on the slide packing member 50.

In the above embodiment, the surface of the slide packing member 50 was coated with a fluoride material. However, the same effect is obtained by coating the inner surface of the annular part 51n of the tube frame 51 and the outer surface of the annular part 53g of the lens frame 53 with a fluoride material. Other materials that reduce sliding frictional resistance may also be used instead of the fluoride material.

Further, although not shown, the same effect may moreover be obtained by using an O-ring formed of a fluoride material or any other material which has a low sliding friction resistance.

In the projecting unit of the projector according to the ninth embodiment, when the orientations of the projecting tube and projecting lens are changed, and even if the compression ratio of slide packing members for maintaining fluid-tightness is set to be large, the two frames can easily be moved by a small force as the frictional resistance is reduced using an anti-friction agent such as a fluoride coated on their surfaces.

Further, since the coating layer forming the lubricating surfaces can be made to adhere firmly and with uniform thickness to the surface of the sliding packing member 50, or to the surface of the frame 41 or 53, there is no unevenness of frictional resistance, high quality is assured and assembly is easier as there is no need to first apply a lubricant such as grease.

Embodiment 10

Figure 25:
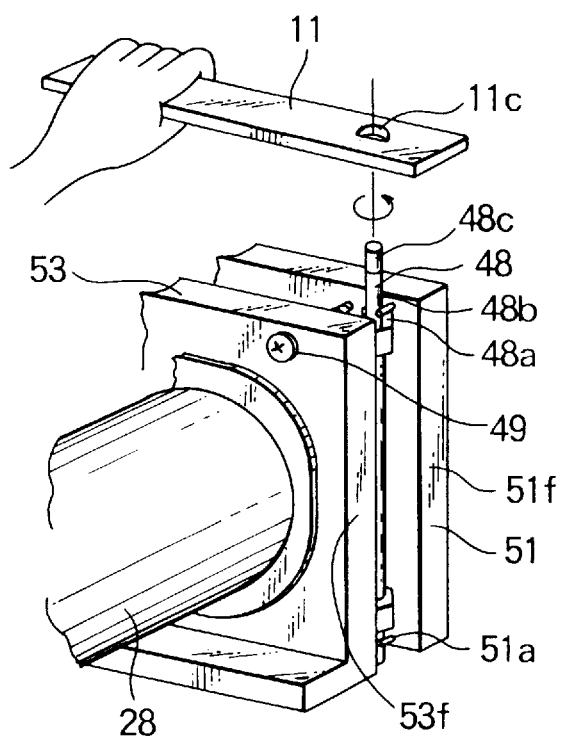
FIG. 25 is a perspective view of an engagement part of a spacer shaft and its associated parts, of a projecting unit according to a tenth embodiment of this invention.
Figure 26:
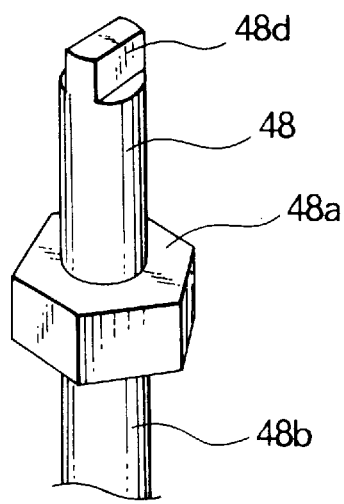
FIG. 26 is a perspective view of another example of engagement part of the spacer shaft.

FIG. 25 is a perspective view of the pertinent parts of a projecting unit of a projector according to a tenth embodiment of this invention showing the spacer unit 48 and a tool for rotating the spacer unit. In the figure, parts identical to those of the first embodiment are assigned the same symbols and their description is omitted.

As described with reference to FIG. 1 and FIG. 2 in connection with the first embodiment, the tube block 81 and lens block 82 are joined together and fixed by tightening the bolt 49, the spacers 48a that come into contact with the flange 51f of the tube frame 51 and the flange 53f of the lens frame 53 being interposed between the blocks. The distances between opposite pairs of surfaces of the upper and lower nuts are different, so the distance and orientation of the tube block 81 relative to the lens block 82 is controlled by interposing spacer surfaces provided at four corners, i.e., top-right, top-left, bottom-right and bottom-left. The upper and lower spacers 48a are joined by the shaft 48b, and are disposed between the pins 51a of the tube frame 51.

According to this embodiment, an engagement part 48c having a semi-circular cross section is formed at one end, i.e., upper end of the shaft 48b for engagement with a turning tool 11 having a semi-circular hole 11c. In the illustrated example, the engagement part 48c projecting out of the space between the flanges 51f and 53f between which the spacers 48a are positioned and held. Because the engagement part 48c is projecting a turning tool which extends laterally relative to the shaft 48b can be used.

In place of the engagement part shown in FIG. 25, any of the engagement parts 48d to 48g shown in FIGS. 26 to 29 may be used. The engagement part 48d shown in FIG. 26 has strip-shaped end (with parallel flat surfaces) extending in parallel with the axis of the shaft 48b. A turning tool similar to the tool 11, but having a hole or a cut-away (with parallel sides) conforming to the strip-shaped engagement part 48d may be used to engage with the engagement part 48d and to turn the shaft 48b.

Figure 27:
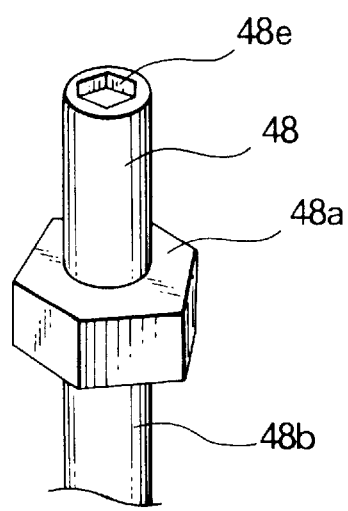
FIG. 27 is a perspective view of a further example of engagement part of the spacer shaft.

The engagement part 48e shown in FIG. 27 has a hexagonal hole 48e (hole with a hexagonal cross section), which is engageable with a wrench with a hexagonal projection, not shown, may be used to turn the shaft 48b.

Figure 28:
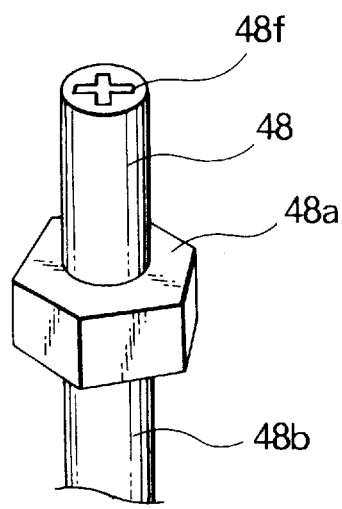
FIG. 28 is a perspective view of a further example of engagement part of the spacer shaft.

The engagement part 48f shown in FIG. 28 has a cross-shaped recess 48f. It may be turned by the use of a cross-shaped screw driver (screw driver with a cross-shaped projection), or some other turning tool having a hole or cut-away conforming with the cross-shaped recess 48f.

Figure 29:
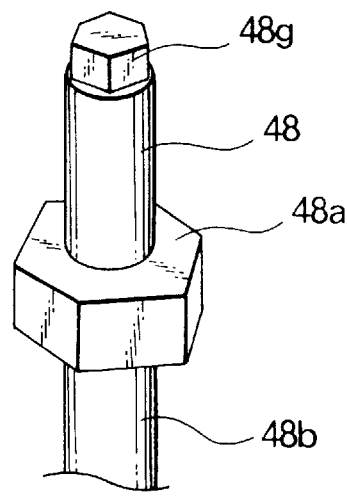
FIG. 29 is a perspective view of a further example of engagement part of the spacer shaft.

The engagement part 48g shown in FIG. 29 has a hexagonal cross section. It may be turned by the use of a wrench, or some other turning tool having a (hexagonal hole) or a cut-away with parallel sides, conforming to or engageable with the hexagonal engagement part 48g.

With any of the engagement part, it is desirable that the engagement part is either projecting out of the space between the flanges 51f and 53f, or otherwise exposed to or accessible by a turning tool from the outside of the frames 51 and 53 for ease of rotation of the shaft 48b.

In the projecting unit of the projector according to the tenth embodiment, the shaft of the spacer unit can be turned by the use of an engagement part that is engageable with a turning tool, so the orientation of the projecting tube block relative to the lens block can easily be adjusted using a small force. Further, the two frames can be separated by the force used to turn the spacer units, so opening/closing of the frames can be easily accomplished without providing a separate opening/closing link mechanism.

Embodiment 11

Figure 30:
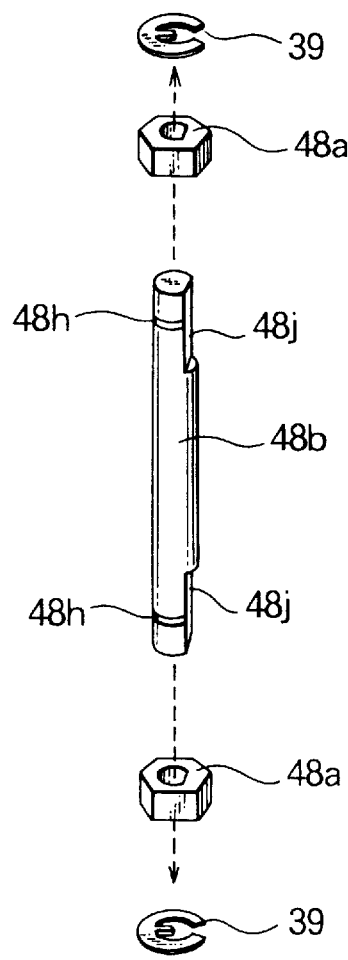
FIG. 30 is an perspective, exploded view of a spacer unit according an eleventh embodiment of this invention.

FIG. 30 is a perspective view showing an example of a spacer unit which can be used in a projecting unit described so far. The spacer unit 48 of this example comprises a shaft 48b and spacers 48a. They are formed separately, and then assembled. For preventing rotation of the spacers 48a, the shaft 48b may be provided with a cut-away 48j toward both ends, and the spacers 48a have a hole conforming to the cross-section of the ends of the shaft 48b with the cut-away 48j. Snap rings 39 are fitted on notches 48h near the respective ends of the shaft 48b to keep the spacers 48a in position.

Figure 31:
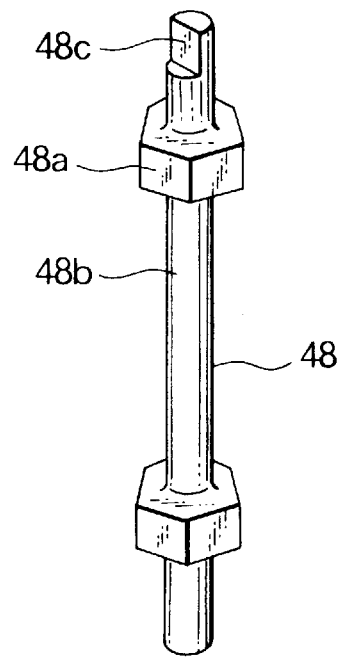
FIG. 31 is a perspective view of a modification of spacer unit according to the eleventh embodiment.
Figure 32:
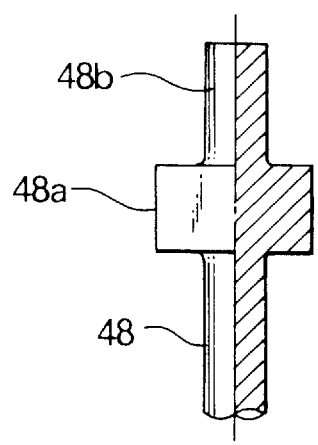
FIG. 32 is a semi-sectional view of the spacer unit of FIG. 31.

FIG. 31 is a perspective view showing an improvement of a spacer unit, and FIG. 32 is a semi-sectional view of the same. In the figures, parts identical to those of the first embodiment are assigned the same symbols and their description is omitted.

As described with reference to FIG. 1, FIG. 2 and FIG. 4 in connection with the first embodiment, the tube block 81 and lens block 82 are joined together and fixed by tightening the bolts 49, the spacers 48a that come into contact with the flange 51f of the tube frame 51 and the flange 53f of the lens frame 53 being interposed between the blocks. The distances between opposite pairs of surfaces of the upper and lower spacers 48a are different, so the distance and orientation of the tube block 81 relative to the lens block 82 may be controlled by interposing spacer surfaces giving a predetermined frame separation between the flanges at four corners, i.e., top-right, top-left, bottom-right and bottom-left. The upper and lower spacers 48a are joined by the shaft 48b, and are disposed between the pins 51a of the tube frame 51.

The shaft 48b and spacers 48a are formed in a one-piece construction by die-casting, for example.

When the orientation of the tube 21 with respect to the lens 28 is changed, the bolts 49 joining the tube frame 51 and lens frame 53 are loosened to enable the two frames to slide. Subsequently when the shaft 48b of the spacer unit 48 is rotated, as the two frames are free to slide, the spacers 48a of the spacer unit 48 rotate as they push the flanges apart. As the spacers 48a and shaft 48b are formed in a one-piece construction, there are no jolts or slipping of the spacers 48a on the shaft 48b. The upper and lower spacers 48a are therefore rotated simultaneously while their relative positions are maintained on the upper and lower parts of the frames. After rotating surfaces of the spacers 48a giving a desired frame separation into positions where they will come into contact with the flange 51f and the flange 53f, the bolts 49 are tightened so as to fix the assembly in position.

When the spacer unit 48 shown in FIG. 31 and FIG. 32 is used, polygonal prisms acting as spacers and shafts acting as rotation axes are formed in a one-piece construction, so that errors in the assembly of the shafts and polygon-shaped members are eliminated and high precision is ensured.

Further, as the upper and lower parts of the two frames are separated apart simultaneously being pushed by the spacers, by rotating the spacer units, the inter-frame spacing can be controlled with high precision. There is also no need to insert and fix the spacers on the shafts as in the example shown in FIG. 30, hence the cost of the shaft formed in a one-piece construction is reduced.

Embodiment 12

Figure 33:
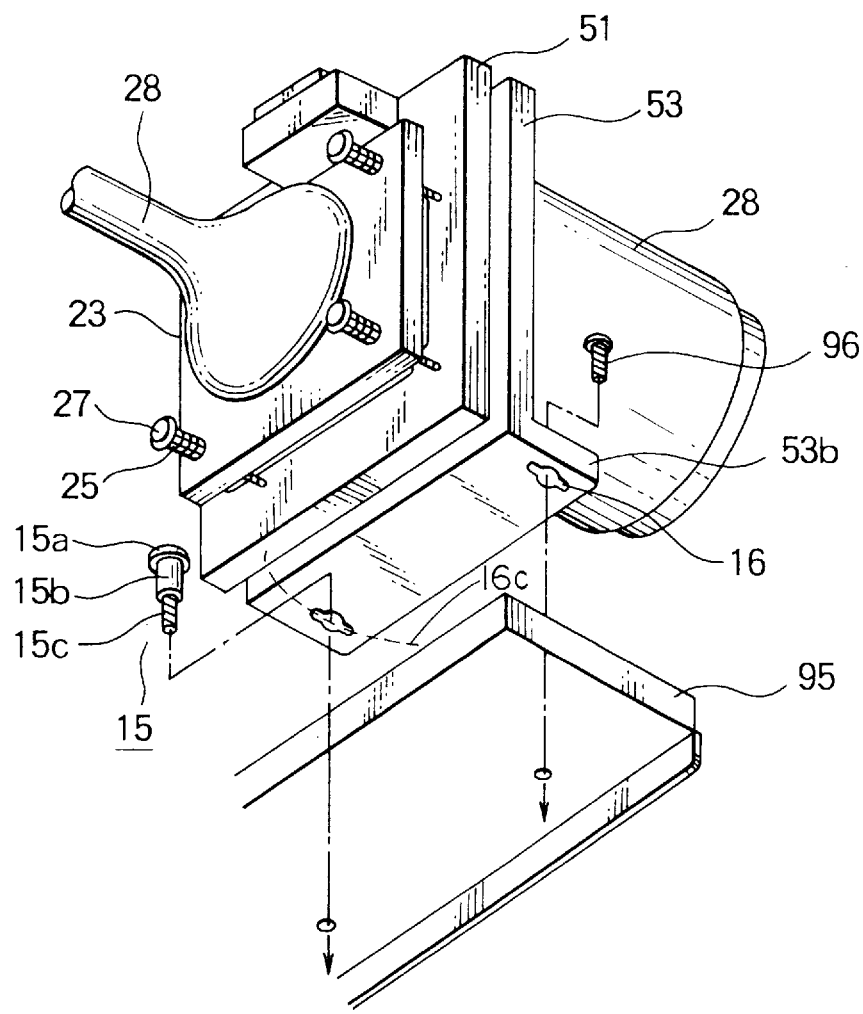
FIG. 33 is a perspective view, as seen from below, of installation member, unit base and their associated parts of a projecting unit according to a twelfth embodiment of this invention.
Figure 34:
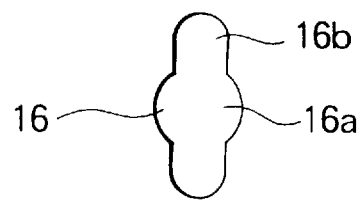
FIG. 34 is an enlarged view of a fixing hole provided in the installation member shown in FIG. 33.

FIG. 33 is a perspective view of the pertinent parts of a projecting unit according to a twelfth embodiment of this invention viewed from underneath. FIG. 34 is an enlarged view of a fixing hole 16 in an installation member 53b. The installation member 53b when fixed on a unit base 95 is as shown in the top views of pertinent parts shown in FIG. 36 and FIG. 37. In the figures, parts identical to those of the first embodiment are assigned the same symbols and their description is omitted.

Fixing holes 16 for fixing the projecting unit 83 to the unit base 95 are provided in a plate-shaped part of the installation member 53b of the lens frame 53. The fixing holes 16 are formed on each side of the installation member 53b. Each of these fixing holes 16 is a combination of a round hole 16a and elongated holes 16b on either side of the round hole 16a. The elongated holes 16b has a width smaller than the diameter of the round hole 16a. The elongated holes 16b of one of the fixing holes 16 extends substantially along an arc 16c centered on the round hole 16a of the other fixing hole 16. An ordinary screw 96 engages with the fixing hole 16 at one side of the installation member 53b, while a stepped screw 15 engages with the fixing hole 16 at the other side of the installation member 53b. The stepped screw 15 comprises a head 15a, a thread part 15c and a larger-diameter part 15b formed between the thread part 15c and the head 15a and having a larger diameter than the thread part 15c. The thread part of the ordinary screw 96 has a diameter smaller than the width of the elongated holes 16b, while the larger-diameter part 15b has a diameter larger than the elongated holes 16b but smaller than the round hole 16a, so that when the stepped screw 15 is screwed sufficiently in the unit base 95 and yet loosened a little, and the screw 96 is also loosened a little, the installation member 53b can turn relative to to the unit base 95, about the stepped screw 15 engaging the round hole 16.

When, of the three projecting units 83, the fixing angles of the left and right units 83 are adjusted so as to change the converging angle θ1, the screw 96 and stepped screw 15 that fix each unit 83 to the unit base 95 are loosened. Then, the larger-diameter part 15b and the round hole 16a form a pivot axis, and the screw 96 can move along the length of the elongated holes 16b. Accordingly, the installation member 53b can be rotated about the pivot axis formed of the larger-diameter part 15b and the round hole 16a at one end of the installation member 53b. The fixing angle of the unit 83 on the unit base 95 can therefore be changed by this rotation.

To enable rotation about the fixing hole on the other side of the installation member 53b, it is sufficient to reverse the positions of the screw 96 and stepped screw 15. That is, the same components can be used for the units disposed at the right and left of the projector. In this way, the converging angles θ1 of the left and right units 83 may be changed by using the fixing holes 16 of the same shape. The only difference between the right and left units is the disposition of the screws 96 and 15.

In the projecting unit of the projector according to the twelfth invention, the orientations of the left and right units can be changed by loosening the ordinary and stepped screws, rotating each of the installation bases about the pivot point formed at the stepped screw, and then tightening the screws. The same lens frames can be used for the right and left units. Accordingly, the cost of manufacturing the mold for forming the lens frames can be reduced, and the assembly of the projector is facilitated.

Embodiment 13

Figure 35:
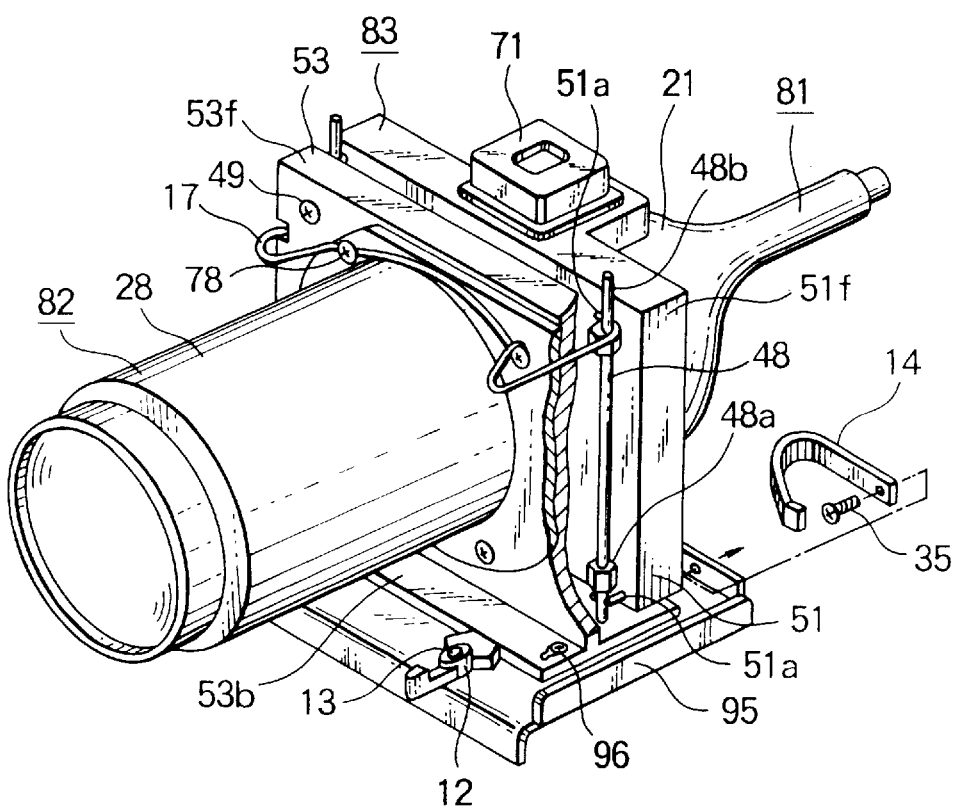
FIG. 35 is a perspective view, partially in section, of a projecting unit according to a thirteenth and fourteenth embodiment of this invention.
Figure 36:
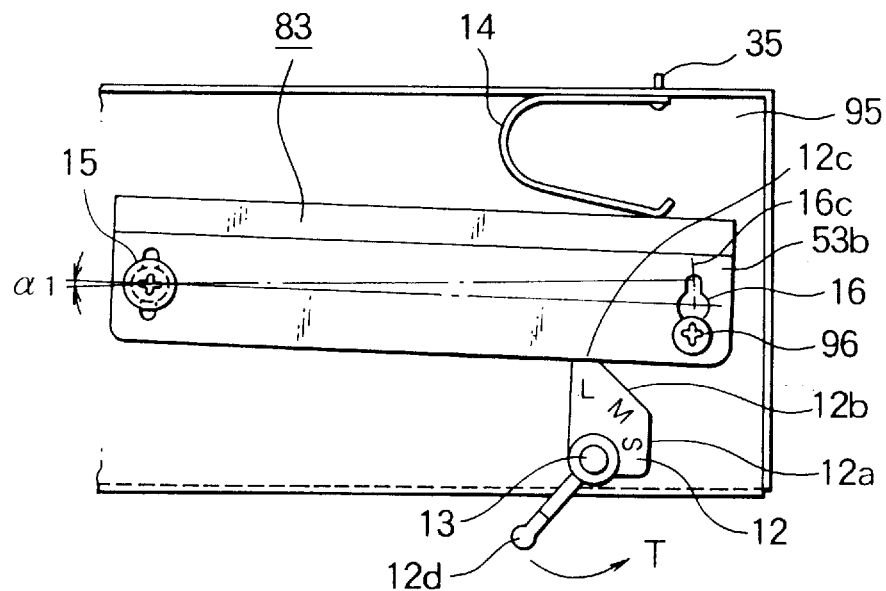
FIG. 36 is a top view of an installation member on a unit base of a projecting unit according to the thirteenth embodiment, with the members mounted on the installation member having been removed.
Figure 37:
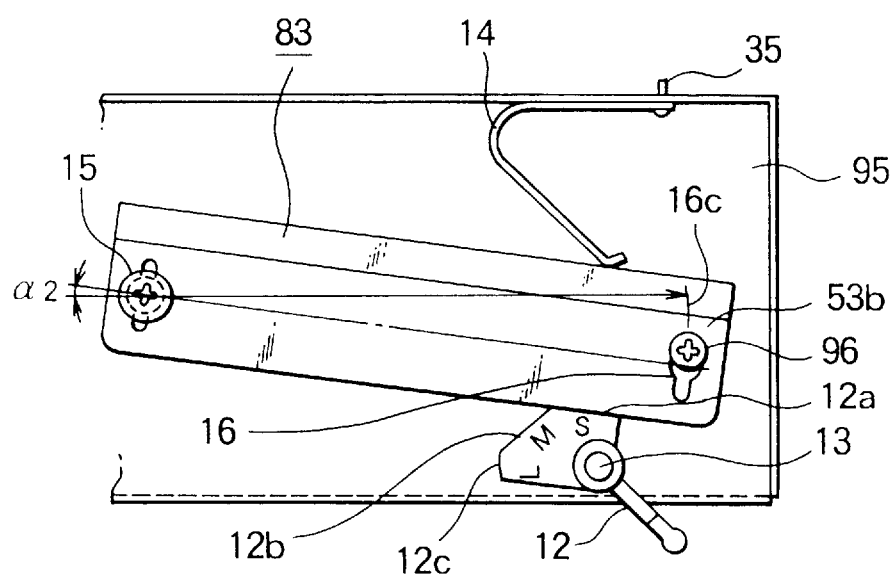
FIG. 37 is a top view similar to FIG. 36, but in a state in which the angle at which the installation member is fixed to the unit base has been changed.

FIG. 35 is a perspective view, partially in section, of a pertinent part of a projecting unit according to a thirteenth embodiment of this invention. FIG. 36 and FIG. 37 are views as seen from above, for different converging angles. In the figures, parts identical to those of the first embodiment are assigned the same symbols and their description is omitted.

Reference numeral 12 denotes an adjusting lever free to pivot about an axis 13 implanted on the unit base 95. The lever 12 is provided with contact surfaces 12a, 12b and 12c at different distances from the pivot axis, and any one of these contact surfaces may be brought into contact with the front surface of the installation member 53b by manipulating the handle 12d. A plate spring 14 is provided at the rear of the installation member 53b of the unit 83 and is fixed to the unit base 95 by means of a screw 35, to push the installation member 53b forwards.

In the state shown in FIG. 36, the contact surface 12c is in contact with the installation member 53b.

For changing the converging angle θ1 of the projecting unit 83 from the state shown in FIG. 36 to the state shown in FIG. 37, the screw 96 and stepped screw 15 fixed to the unit base 95 are loosened so that the installation member 53b is free to rotate about the stepped screw 15. The handle 12d of the adjusting lever 12 is then rotated in a direction T shown by the arrow in FIG. 36, the installation member 53b is rotated by the action of the plate spring 14, so that the surface 12a is brought into contact with the installation member 53b. As the distances of the surfaces 12a, 12b, 12c from the pivot axis 13 of the lever 12 are different, the angle of the unit 83 relative to the base unit 95 is changed from α1 to α2. The unit 83 is thereby set to a new converging angle θ1, and the screws 96, 15 are again tightened.

For changing the converging angle θ1 of the projecting unit 83 from the state shown in FIG. 37 to the state shown in FIG. 36, the screw 96 and stepped screw 15 fixed to the unit base 95 are loosened, and the handle 12d of the adjusting lever 12 is then rotated in the direction opposite to the direction T. Then, the installation member 53b is rotated being pushed by the contact surfaces of the lever 12, overcoming the action of the plate spring 14, and the surface 12c is brought into contact with the installation member 53b.

In the projecting unit of the projector according to the thirteenth embodiment, the angle at which the projecting unit is installed on the base can be changed by loosening the screwing and rotating the lever. The change of the installation angle, which is required when the projecting direction of each projecting unit needs to be changed according to the screen size, for instance, can be accomplished easily.

Embodiment 14

Figure 38:
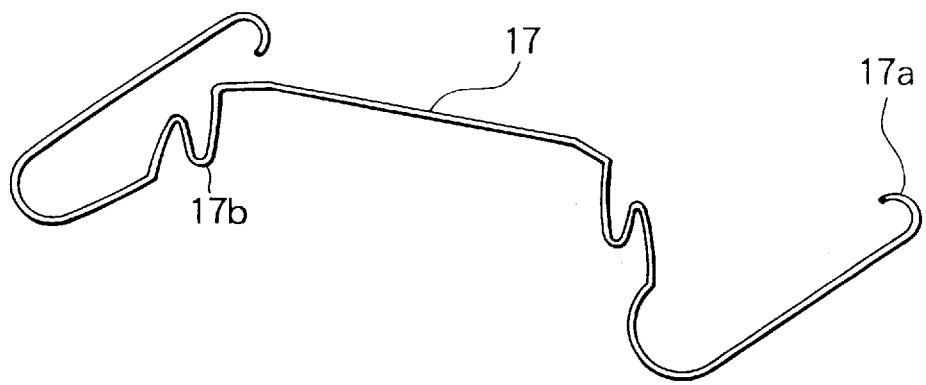
FIG. 38 is a perspective view of a pressing member according to the fourteenth embodiment of this invention.
Figure 39:
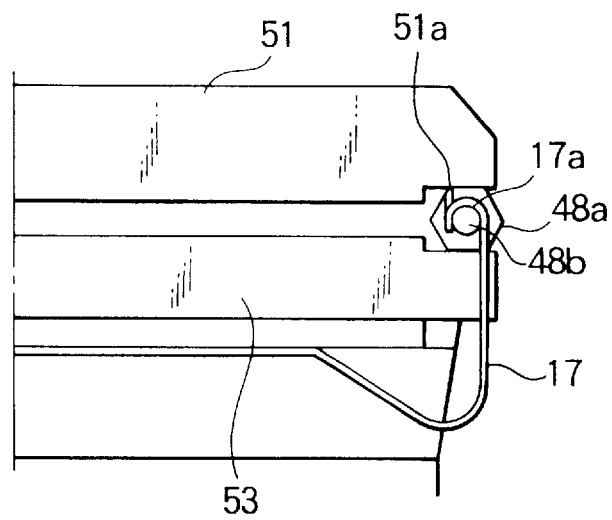
FIG. 39 is a view, as seen from above, of the pressing member holding the spacer shaft.
Figure 40:
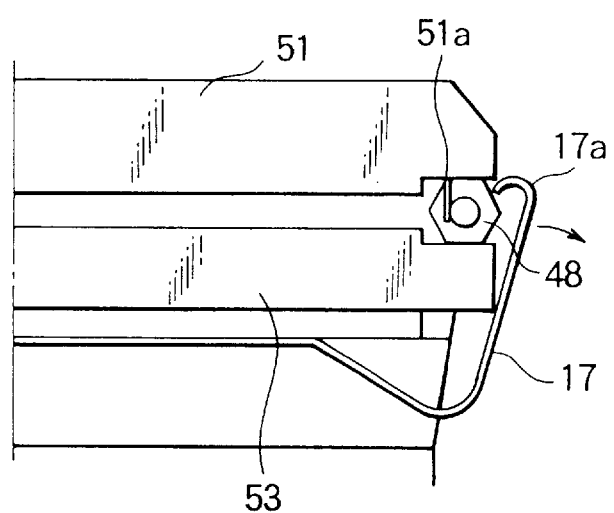
FIG. 40 is a view similar to FIG. 39, of the pressing member being disengaged from the spacer shaft.

A fourteenth embodiment of the invention will be described with reference to FIG. 38 and FIG. 39, as well as FIG. 35. This embodiment relates to an arrangement for holding the spacer unit 48, in such a manner as to facilitate exchange of the spacer unit 48. FIG. 38 is a perspective view of a holding member 17 attached to the lens frame 53. FIG. 39 is a view from above showing the spacer unit 48 engaged with the projecting unit 83 being held by the holding member 17. FIG. 40 is a view from above showing the holding member 17 disengaged. In the figures, parts identical to those of the first embodiment are assigned the same symbols and their description is omitted.

The holding member 17 is formed of metal wire, and has hook parts 17a at both ends of the holding member 17, for holding the upper parts of the shafts 48b, and round parts 17b for engagement with screws 78, by which the holding member 17 is attached to the lens frame 53.

The tube block 81 is joined with the lens block 82 by tightening the bolts 49, the spacers 48a in contact with the flange 51f of the tube frame 51 and the flange 53f of the lens 53 being interposed between the blocks. The distances between opposite surfaces of the spacers 48a are different, and the distance and orientation of the tube block 81 relative to the lens block 82 are determined by selecting the pair of opposite surfaces of each of the spacers 48a for contact with the flanges 51f and 53f, at four locations, i.e., top-left, top-right, bottom-left and bottom-right. The upper and lower spacers 48a of each spacer unit 48 are joined to the shafts 48b. The spacer 48a provided at the lower part of the tube frame 51 is situated between two pins 51a, while the spacer 48a provided at the upper part of the tube frame 51 is provided in engagement with a single pin 51a, and held by the hook part 17a of the holding member 17, as shown in FIG. 39. Because of the spring action of the holding member 17, the hook part 17a of the holding member 17 presses the shaft 48b of the spacer unit 48 against the pin 51a, so that the shaft 48b is held between the pint 51 and the hook part 17a of the holding member 17. In the state shown in FIG. 40, the hook part 17a of the holding member 17 is disengaged, and the spacer unit 48 can be removed and exchanged.

For changing the orientation of the tube 21 relative to the lens 28, the bolts 49 joining the tube frame 51 to the lens frame 53 are loosened to enable the two frames to slide. The spacer units 48 may then be rotated so as to vary the frame spacing and inclination. However, the variation in the spacing by the use of the same spacer unit is limited by the number of pairs of opposite surfaces, which is three if the spacer of the spacer unit comprises a hexagonal prism. If the spacing need to be varied to a larger extent, such as when the use of the projecting unit is changed from one for forming a front projector to one for forming a rear projector housed in a cabinet, it is then necessary to replace the spacer unit 48. The arrangement of this embodiment facilitates this replacement of the spacer unit 48, eliminating the risk of the spacer 48a falling out. When the screws 49 are tightened, the spacers 48a are pressed between the flanges 51f and 53f. When the screws 49 are loosened, the upper part of the spacer unit 48 is held by the holding member 17, as well as the pin 51a and the flange 53f, while the lower part is held between the pins 51a and the flanges 51f and 53f, so that the spacer unit 48 is prevented from falling. When it is desired to remove the spacer unit 48 for exchange, the hook part 17a of of holding member 17 is bent outwards, and disengaged from the spacer shaft 48b. This can be achieved by simply pulling the hook part 17a outwards. In this state, the lower part of the shaft 48b is still held by the pins 51a and the flanges 51f and 53f. Then, the shaft 48b is pulled upward. To insert a new spacer unit 48, the reverse procedure is followed. That is, the new spacer unit 48 is be inserted from above, such that the lower end of the shaft 48b is held between the pins 51a and the flanges 51f and 53f, and then the hook part 17a of the holding member 17 is pushed inwards, to be engaged with the shaft 48b.

Although not shown, the same effect may be obtained by installing the holding members 17 at the top and bottom part of the frame 51 (rather than the frame 53, as in the illustrated example).

In the projecting unit according to the fourteenth embodiment, the shafts of the spacer units are held by holding members which resiliently press the shafts against the pins. Even when the frames are separated in order to replace a spacer unit, therefore, the spacer unit does not fall out, and it can easily be removed. Moreover, when the spacer unit is inserted, pins and the holding members are utilized for positioning the spacer unit. The orientation of the projecting tube relative to the projecting lens can therefore be achieved easily and precisely.

Embodiment 15

Figure 41:
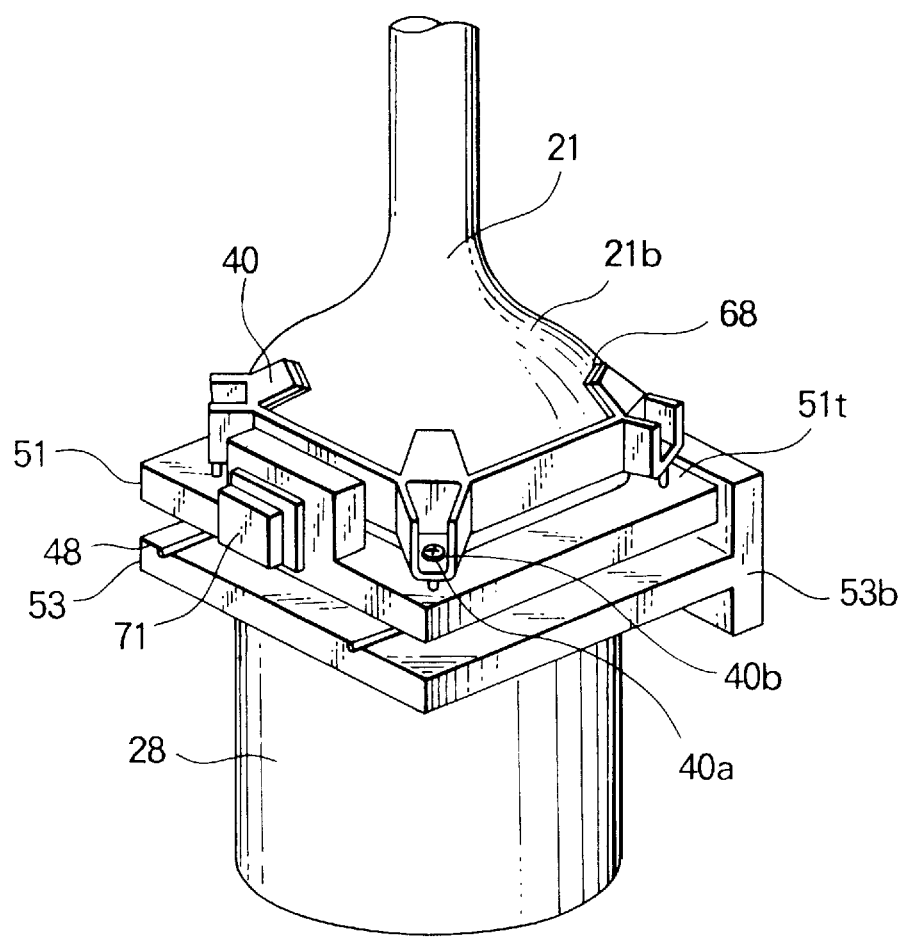
FIG. 41 and FIG. 42 are perspective views showing members for holding the tube.

FIG. 41 is a perspective view of an arrangement for attaching the tube 21 to the tube frame 51. In the figure, the tube 21 is installed on the tube frame 51 via a tube packing, not shown, as in the prior art or the first embodiment, however the manner of attachment is different as described hereinafter. A tube holding member 40 made of a rigid material is installed in contact with an outer wall 21b of the tube 21 with a rubber sheet 68 interposed between the holding member 40 and the outer wall 21b as a shock absorber, and screws 40b that pass through holes 40a in the tube holding member 40 are screwed into the tube frame 51. Gaps 100 are left between the tube holding member 40 and a fixing surface 51t of the tube frame 51, so that by tightening the screws 40b, the holding member 40 is pressed against the outer wall 21b, and the tube 21 is firmly held to the tube frame 51. This arrangement for fixing the projecting tube 21 may be used in conjunction with the arrangements described in any of the first to fourteenth embodiments inclusive.

Embodiment 16

Figure 42:
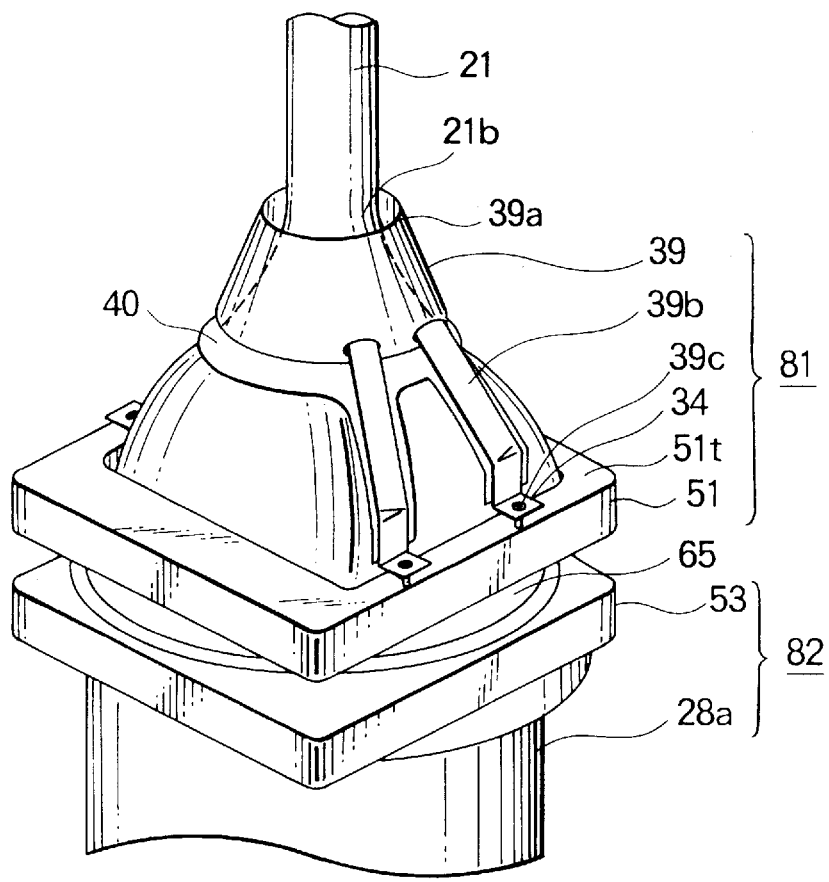
Figure 43:
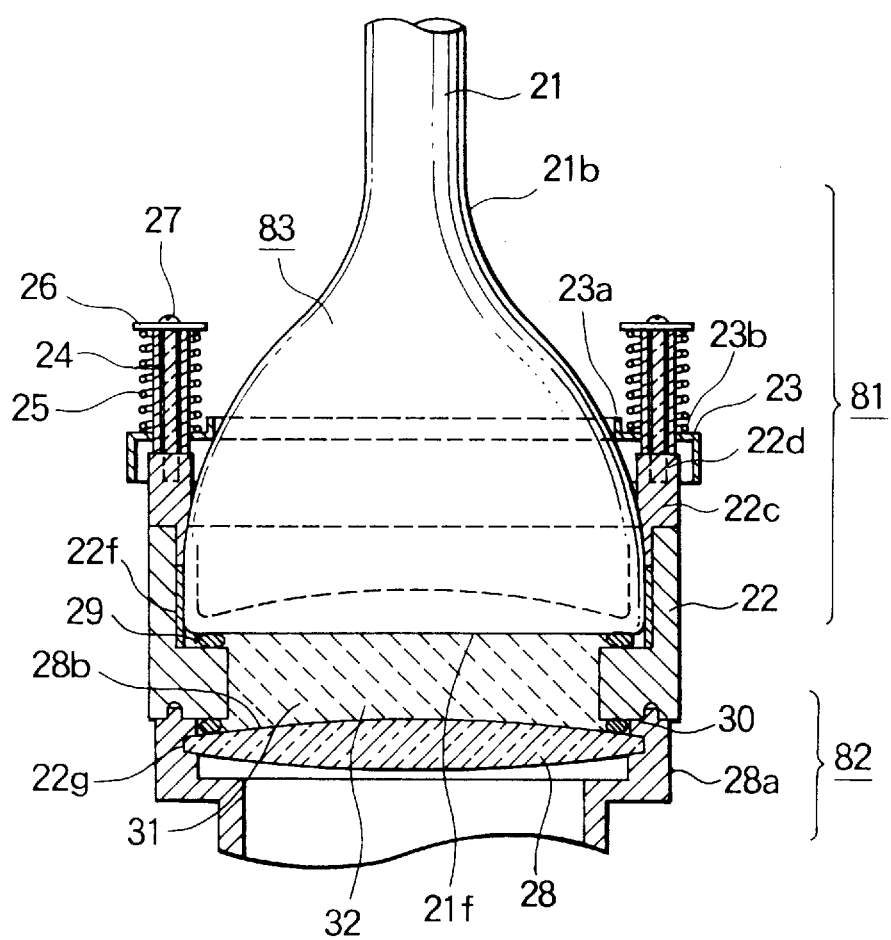
FIG. 43 is a sectional view of a conventional projecting unit.
Figure 44:
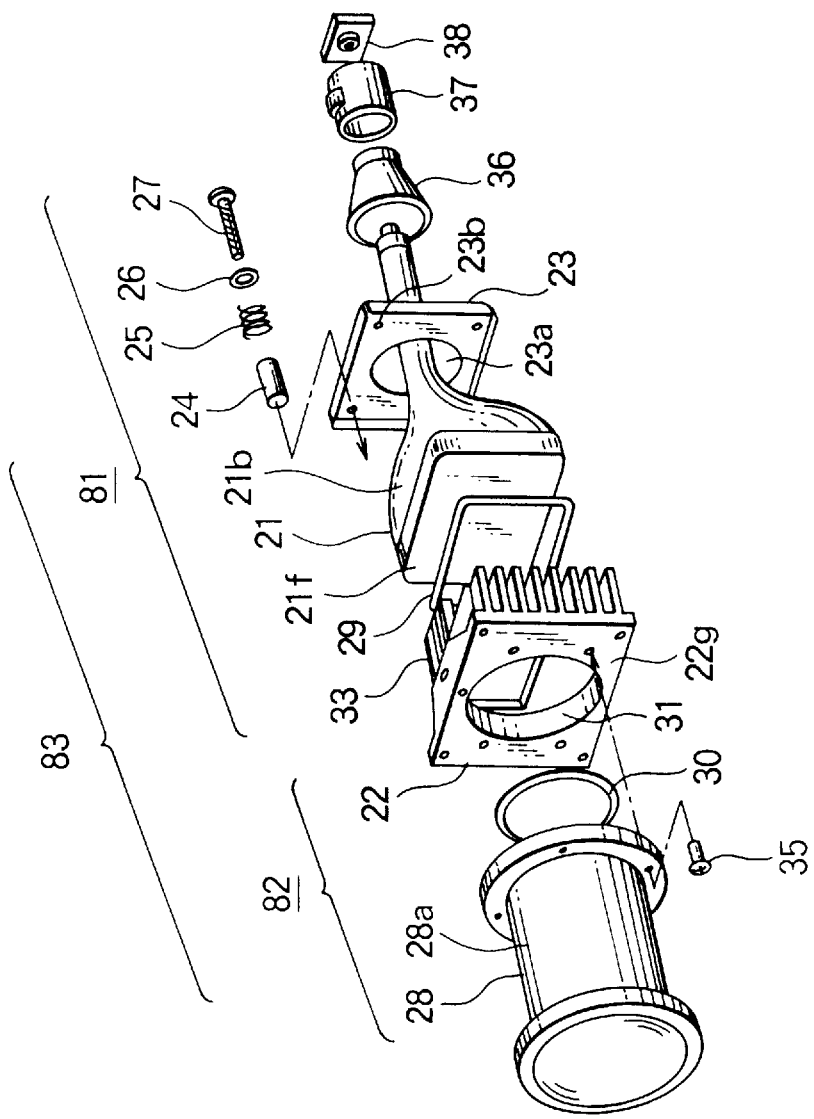
FIG. 44 is a perspective, exploded view of the projecting unit of FIG. 43.
Figure 45:
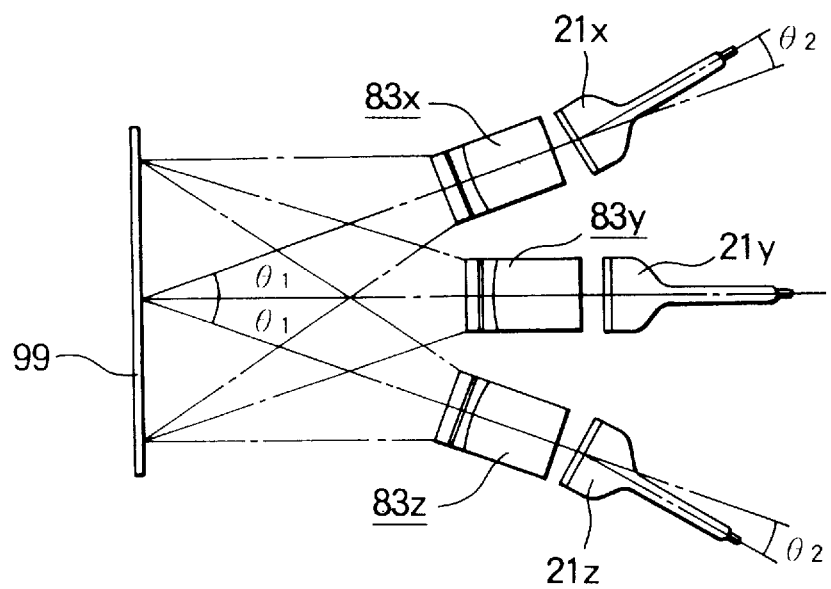
FIG. 45 is a schematic view showing how the three projecting units are oriented.
Figure 46:
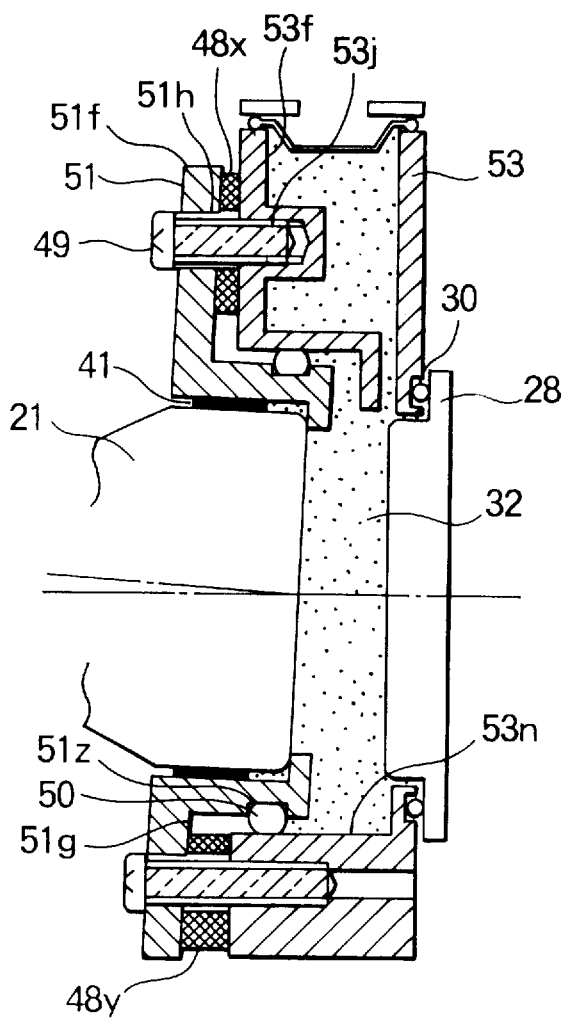
FIG. 46 is a sectional view showing tube and lens frames, and a cooling medium filled between the tube and the lens, according to another conventional projecting unit.

FIG. 42 is a perspective view of yet another arrangement for attaching the tube 21 to the tube frame 51. In the figure, the tube 21 is installed on the tube frame 51 via a tube packing, not shown, as in the prior art or the first embodiment, however the manner of attachment is different as described hereinafter. An annular part 39a of a projecting tube band 39 is arranged to be in engagement with the outer wall 21b of the projecting tube 21, with a rubber sheet 40 being interposed between the annular part 39a and the outer wall 21b as a shock absorber, and screws 34 that pass through holes in the ends of four legs 39b of this tube band 39 are screwed into the tube frame 51. Gaps are left between the ends of the legs 39b of the band 39 and the fixing surface 51t of the tube frame 51 so that the tube 21 is pressed against the tube frame 51 as the screws 34 are tightened. Because of the elasticity of the legs 39b, any vibrations and shocks are absorbed.

The same effect may be obtained if this arrangement for installation is used in conjunction with any of the arrangements used to join the tube frame 51 to the lens frame 53 described in the first to fourteenth embodiments inclusive Further, according to the aforesaid description, the spacers 48a interposed between the tube frame 51 and lens frame 53 were hexagonal prisms, but they may also be prisms having other polygonal cross sections.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projecting unit of a projector having a projecting tube sealingly attached to a projecting tube frame, a projecting lens sealingly attached to a projecting lens frame, wherein an image on the projecting tube is enlarged and projected on a screen by the projecting lens, said projecting unit comprising:

a packing member interposed between and in engagement with said tube frame and said lens frame such that said tube frame and said lens frame are sealingly attached, and said frames can slide against said packing member;

a securing member securing said tube frame and said lens frame to each other; and a separating member adjustably separating said tube frame and said lens frame from each other said separating member including a compound screw having a first thread part and a second thread part, said first and second thread parts having hands opposite to each other;

a tapped member rotatably supported by a first one of said frames and having a tapped hole into which said first thread part is screwed; and a second one of said frames has a tapped part through which said second thread part is screwed, whereby as said compound screw is turned in one or the other direction, the spacing between said frames is increased or decreased.

2. The projecting unit according to claim 1, further comprising:

a tube holding member extending around a front, peripheral portion of the projection tube and having corner tab portions extending from respective corners of said tube holding member towards a rear portion of the projection tube, a resilient sheet interposed between said tube holding member and an outer wall of the projection tube;

a gap formed between said tube holding member and a fixing surface of said projection tube frame;

a plurality of holes in said tube holding member aligned with a plurality of holes in said projection tube frame;

a plurality of screws;

wherein said plurality of screws are respectively driven through the plurality of holes in said tube holding member and said projection tube frame to thereby span said gap, whereby said gap permits said plurality of screws to firmly press said tube holding member against said resilient sheet and the outer wall of the projection tube to thereby secure the projection tube.

3. The projecting unit according to claim 2, wherein said resilient sheet is a rubber sheet.

4. A projecting unit of a projector having a projecting tube sealingly attached to a projecting tube frame, a projecting lens sealingly attached to a projecting lens frame, wherein an image on the projecting tube is enlarged and projected on a screen by the projecting lens, said projecting unit comprising:

a packing member interposed between and in engagement with said tube frame and said lens frame such that said tube frame and said lens frame are sealingly attached, and said frames can slide against said packing member;

a securing member securing said tube frame and said lens frame to each other; and a separating member adjustably separating the tube frame and the lens frame from each other by applying a separating force to said tube frame and said lens frame, wherein said securing member is separate from said separating member;

said separating member including:

an adjusting screw rotatably supported on one of said frames;

a coupling member having a tapped part through which said adjusting screw is screwed;

a first link pivotally coupled at one end thereof with said coupling member, and pivotally coupled at a second end thereof with said one of said frames; and a second link pivotally coupled at one end thereof with said coupling member, and pivotally coupled at a second end thereof with said the other of said frames whereby as said adjusting screw is turned in one or the other direction, the second ends of said first and second links are pulled together or pushed apart to adjust the separation of said frames.

5. A projecting unit of a projector having a projecting tube sealingly attached to a projecting tube frame, a projecting lens sealingly attached to a projecting lens frame, wherein an image on the projecting tube is enlarged and projected on a screen by the projecting lens, said projecting unit comprising:
- a packing member interposed between and in engagement with said tube frame and said lens frame such that said tube frame and said lens frame are sealingly attached, and said frames can slide against said packing member;
- a securing member securing said tube frame and said lens frame to each other; and
- a separating member adjustably separating the tube frame and the lens frame from each other by applying a separating force to said tube frame and said lens frame,
- wherein said securing member is separate from said separating member;
- said separating member including:
  - an adjusting screw rotatably supported on one of said frames and having a thread part;
  - a slider having a tapped part in engagement with said thread part of said adjusting screw; and
  - a guide member fixed to the other of said frames and having a guide groove, said slider in slidable engagement with said guide groove;
  - whereby as said adjusting screw is turned in one or the other direction, said slider moves along with said guide groove and the spacing between said frames is increased or decreased.

6. A projecting unit of a projector having a projecting tube sealingly attached to a projecting tube frame, a projecting lens sealingly attached to a projecting lens frame, wherein an image on the projecting tube is enlarged and projected on a screen by the projecting lens, said projecting unit comprising:
- a packing member interposed between and in engagement with said tube frame and said lens frame such that said tube frame and said lens frame are sealingly attached, and said frames can slide against said packing member;
- a securing member securing said tube frame and said lens frame to each other; and
- a separating member adjustably separating the tube frame and the lens frame from each other by applying a separating force to said tube frame and said lens frame,
- wherein said securing member is separate from said separating member;
- wherein said packing member is coated with a lubricating agent.

7. A projecting unit of a projector having a projecting tube sealingly attached to a projecting tube frame, a projecting lens sealingly attached to a projecting lens frame, wherein an image on the projecting tube is enlarged and projected on a screen by the projecting lens, said projecting unit comprising:
- a packing member interposed between and in engagement with said tube frame and said lens frame such that said tube frame and said lens frame are sealingly attached, and said frames can slide against said packing member;
- a securing member securing said tube frame and said lens frame to each other; and
- a separating member adjustably separating the tube frame and the lens frame from each other by applying a separating force to said tube frame and said lens frame,
- wherein said securing member is separate from said separating member;
- wherein said packing member is coated with an anti-friction agent.

8. A projecting unit of a projector having a projecting tube sealingly attached to a projecting tube frame, a projecting lens sealingly attached to a projecting lens frame, wherein an image on the projecting tube is enlarged and projected on a screen by the projecting lens, said projecting unit comprising:
- a packing member interposed between and in engagement with said tube frame and said lens frame such that said tube frame and said lens frame are sealingly attached, and said frames can slide against said packing member;
- a securing member securing said tube frame and said lens frame to each other; and
- a separating member adjustably separating said tube frame and said lens frame from each other;
- an installation member for fixing said projecting unit to a unit base, said installation member having a plate-shaped part for engagement with the unit base; and
- a pair of fixing holes provided in said plate-shaped part of said installation member, each of said fixing holes including a round hole and elongated holes formed in mutually opposite directions with respect to the round hole, the elongated holes having a width smaller than a diameter of the round hole, the elongated holes of one of said fixing holes extending substantially along an arc centered on the round hole of the other fixing hole;
- said fixing holes permitting said installation member to be secured to the unit base.

9. The projecting unit according to claim 8, further comprising;
- an adjusting lever pivotally mounted on the unit base, said adjusting lever having a plurality of contact surfaces at different distances from a pivot axis on the unit base, one of said contact surfaces being selected for engagement with a surface of said installation member; and
- a spring member for biasing said installation member in such a direction that said installation member is pressed against the selected one of said contact surfaces.

10. A projecting unit of a projector having a projecting tube sealingly attached to a projecting tube frame, a projecting lens sealingly attached to a projecting lens frame, wherein an image on the projecting tube is enlarged and projected on a screen by the projecting lens, said projecting unit comprising:
- a packing member interposed between and in engagement with said tube frame and said lens frame such that said tube frame and said lens frame are sealingly attached, and said frames can slide against said packing member;
- a securing member securing said tube frame and said lens frame to each other; and
- a separating member adjustably separating the tube frame and the lens frame from each other by applying a separating force to said tube frame and said lens frame,
- wherein said securing member is separate from said separating member;
- an installation member for fixing said projecting unit to a unit base;
- an adjusting lever pivotally mounted on the unit base, said lever having a plurality of contact surfaces at different distances from a pivot axis on the unit base, one of said contact surfaces being selected for engagement with a first surface of said installation member; and
- a spring member for pushing a second surface of said installation member opposite to said first surface, so as to press said first surface against the selected one of said contact surfaces.

11. A projecting unit of a projector having a projecting tube sealingly attached to a projecting tube frame, a projecting lens sealingly attached to a projecting lens frame, wherein an image on the projecting tube is enlarged and projected on a screen by the projecting lens, said projecting unit comprising:

a packing member interposed between and in engagement with said tube frame and said lens frame such that said tube frame and said lens frame are sealingly attached, and said frames can slide against said packing member;

a securing member securing said tube frame and said lens frame to each other; and a separating member adjustably separating said tube frame and said lens frame from each other spacers, each of which has at least two pairs of opposite surfaces, distances between the at least two pairs of opposite surfaces being different from each other, and one pair of said at least two pairs of opposite pairs being selected for engagement with said frames for determining the spacing between said frames.

12. The projecting unit according to claim 11 wherein said securing member includes a bolt that extends through one of said lens frame and said tube frame and has a thread part which is screwed into a tapped part on the other of said lens frame and said tube frame so as to secure said lens frame and said tube frame to each other.

13. The projecting unit according to claim 12, further comprising a stopper attached near an end of said thread part for engagement with said second one of said frames so as to prevent the bolt from being detached from said second one of said frames as said bolt is loosened.

14. The projecting unit according to claim 11, further comprising means for rotating the spacers to cause a selected pair of opposite surfaces of each of the spacers to engage with said frames.

15. The projecting unit according to claim 14, wherein each of said spacers includes a polygonal prism having pairs of substantially parallel opposite surfaces, said means for rotating the spacers including a shaft coaxially connected to said prism such that rotation of said shaft causes rotation of said prism, and one end of said shaft is accessible from outside of said frames and is provided with a tool engagement part for engagement with a turning tool to allow said turning tool to turn said shaft.

16. The projecting unit according to claim 15, wherein said one end of said shaft is exposed to the outside of said frames.

17. The projecting unit according to claim 16, further comprising a holding member formed of a resilient material attached to said lens frame, and having an end for holding said shaft, and allowing said shaft to be disengaged from said end by the resilient deformation of said end.

18. The projecting unit according to claim 17, further comprising a pin attached to said lens frame, said shaft being held between said end of said holding member and said pin.

19. The projecting unit according to claim 15, wherein said frames respectively have flange parts, said spacers are placed between said flange parts, and said one end of said shaft projects out of a space between said flange parts.

20. The projecting unit according to claim 15, wherein said shaft is connected to two of said spacers aligned with each other.

21. The projecting unit according to claim 15, wherein said spacer and said shaft are formed in a one-piece construction.

22. The projecting unit according to claim 15, further comprising:

a holding member formed of a resilient material attached to said lens frame, and having an end for holding said shaft, and allowing said shaft to be disengaged from said end by the resilient deformation of said end.

23. The projecting unit according to claim 22, further comprising a pin attached to said lens frame, said shaft being held between said end of said holding member and said pin.

24. A method of sealingly attaching a projecting tube to a projecting tube frame and a projecting lens to a projecting lens frame in a projecting unit wherein an image on the projecting tube is enlarged and projected on a screen by the projecting lens, said method comprising the steps of:

interposing a packing member between and in engagement with the tube frame and the lens frame such that the tube frame and the lens frame are sealingly attached and such that the frames can slide against the packing member;

securing the tube frame and the lens frame to each other with a securing member; and adjustably separating the tube frame and the lens frame from each other with a separating member including the substeps of:

providing a compound screw having a first thread part and a second thread part, the first and second thread parts having hands opposite to each other;

rotatably supporting a tapped member by a first one of the frames;

providing the tapped member with a tapped hole into which the first thread part is screwed; and screwing the second thread part into a tapped part in a second one of the frames, whereby as the compound screw is turned in one or the other direction, the spacing between the frames is increased or decreased.

25. A method of sealingly attaching a projection tube to a projecting tube frame and a projecting lens to a projecting lens frame in a projecting unit wherein an image on the projecting tube is enlarged and projected on a screen by the projecting lens, said method comprising the steps of:

interposing a packing member between and in engagement with the tube frame and the lens frame such that the tube frame and the lens frame are sealingly attached and such that the frames can slide against the packing member;

securing the tube frame and the lens frame to each other with a securing member; and adjustably separating the tube frame and the lens frame from each other by applying a separating force to the tube frame and the lens frame with a separating member said separating step including the substeps of:

rotatably supporting an adjusting screw having a thread part on one of the frames;

engaging a slider having a tapped part with the thread part of the adjusting screw;

fixing a guide member having a guide groove to the other of the frames; and bringing the slider into slidable engagement with the guide groove, whereby as the adjusting screw is turned in one or the other direction, the slider moves along with the guide groove and the spacing between the frames is increased or decreased.

26. A method of sealingly attaching a projection tube to a projecting tube frame and a projecting lens to a projecting lens frame in a projecting unit wherein an image on the projecting tube is enlarged and projected on a screen by the projecting lens, said method comprising the steps of:

interposing a packing member between and in engagement with the tube frame and the lens frame such that the tube frame and the lens frame are sealingly attached and such that the frames can slide against the packing member;

securing the tube frame and the lens frame to each other with a securing member;

adjustable separating the tube frame and the lens frame from each other by applying a separating force to the tube frame and the lens frame with a separating member; and coating the packing member with a lubricating agent.

27. A method of sealingly attaching a projection tube to a projecting tube frame and a projecting lens to a projecting lens frame in a projecting unit wherein an image on the projecting tube is enlarged and projected on a screen by the projecting lens, said method comprising the steps of:

interposing a packing member between and in engagement with the tube frame and the lens frame such that the tube frame and the lens frame are sealingly attached and such that the frames can slide against the packing member;

securing the tube frame and the lens frame to each other with a securing member;

adjustably separating the tube frame and the lens frame from each other by applying a separating force to the tube frame and the lens frame with a separating member; and coating the packing member with an anti-friction agent.

28. A method of sealingly attaching a projection tube to a projecting tube frame and a projecting lens to a projecting lens frame in a projecting unit wherein an image on the projecting tube is enlarged and projected on a screen by the projecting lens, said method comprising the steps of:

interposing a packing member between and in engagement with the tube frame and the lens frame such that the tube frame and the lens frame are sealingly attached and such that the frames can slide against the packing member;

securing the tube frame and the lens frame to each other with a securing member; and adjustable separating the tube frame and the lens frame from each other by applying a separating force to the tube frame and the lens frame with a separating member;

fixing the projecting unit to a unit base with an installation member;

providing the installation member with a plate-shaped part for engagement with the unit base; and providing a pair of fixing holes in the plate-shaped part of the installation member such that each of the fixing holes includes a round hole and elongated holes formed in mutually opposite directions with respect to the round hole, the elongated holes have a width smaller than a diameter of the round hole, and the elongated holes of one of the fixing holes extend substantially along an arc centered on the round hole of the other fixing hole, wherein the fixing holes permit the installation member to be secured to the unit base.

29. The method of claim 28, further comprising the steps of:

pivotally mounting an adjusting lever having a plurality of contact surfaces at different distances from a pivot axis on the unit base;

selecting one of the contact surfaces for engagement with a surface of the installation member; and biasing the installation member with a spring member in such a direction that the installation member is pressed against the selected one of the contact surfaces selected by said selecting step.

30. A method of sealingly attaching a projection tube to a projecting tube frame and a projecting lens to a projecting lens frame in a projecting unit wherein an image on the projecting tube is enlarged and projected on a screen by the projecting lens, said method comprising the steps of:

interposing a packing member between and in engagement with the tube frame and the lens frame such that the tube frame and the lens frame are sealingly attached and such that the frames can slide against the packing member;

securing the tube frame and the lens frame to each other with a securing member;

adjustably separating the tube frame and the lens frame from each other by applying a separating force to the tube frame and the lens frame with a separating member;

providing an installation member for fixing the projecting unit to a unit base;

pivotally mounting an adjusting lever having a plurality of contact surfaces at different distances from a pivot axis on the unit base;

selecting one of the contact surfaces for engagement with a first surface of the installation member; and pushing a second surface of the installation member opposite to the first surface with a spring member so as to press the first surface against the selected one of the contact surfaces.

31. A method of sealingly attaching a projecting tube to a projecting tube frame and a projecting lens to a projecting lens frame in a projecting unit wherein an image on the projecting tube is enlarged and projected on a screen by the projecting lens, said method comprising the steps of:

interposing a packing member between and in engagement with the tube frame and the lens frame such that the tube frame and the lens frame are sealingly attached and such that the frames can slide against the packing member;

securing the tube frame and the lens frame to each other with a securing member;

adjustably separating the tube frame and the lens frame from each other with a separating member;

providing spacers between the frames, each of which has at least two pairs of opposite surfaces such that distances between the at least pairs of opposite surfaces are different from each other; and selecting one pair of the at least two pairs of opposite surfaces for engagement with the frames for determining the spacing between the frames.

32. The method of claim 31, further comprising the step of rotating the spacers to cause a selected pair of the at least two pairs opposite surfaces of each of the spacers to engage with the frames.

33. The method of claim 32, said providing spacers step including the substeps of: providing each of the spacers with shape corresponding to a polygonal prism having pairs of substantially parallel opposite surfaces, the method further comprising the steps of:

coaxially connecting a shaft to the spacers such that rotation of the shaft causes rotation of the prism;

extending the shaft such that the shaft is accessible from outside of the frames; and providing the shaft with a tool engagement part for engagement with a turning tool to allow the turning tool to turn the shaft.

34. The method of claim 33, wherein said extending the shaft step extends the shaft such that one end of the shaft is exposed to an outside of the frames.

35. The method of claim 34, further comprising the steps of:

attaching a holding member formed of a resilient material to the lens frame;

providing the holding member with an end for holding the shaft; and allowing the shaft to be disengaged from the end by the resilient deformation of the end.

36. The method of claim 35, further comprising the steps of:

attaching a pin to the lens frame; and holding the shaft between the end of the holding member and the pin.

37. The method of claim 33, further comprising the steps of:

providing the frames with flange parts;

placing the spacers between the flange parts; and extending the one end of the shaft out of a space between the flange parts.

38. The method of claim 33, further comprising the steps of:

aligning two of the spacers with each other; and connecting the shaft to two of the aligned spacers.

39. The method of claim 33, further comprising the step of integrally constructing the spacer and the shaft.

40. The method of claim 31, further comprising the steps of:

attaching a holding member formed of a resilient material to the lens frame;

providing the holding member with an end for holding the shaft; and allowing the shaft to be disengaged from the end by the resilient deformation of the end.

41. The method of claim 40, further comprising the steps of:

attaching a pin to the lens frame; and holding the shaft between the end of the holding member and the pin.

42. A method of sealingly attaching a projection tube to a projecting tube frame and a projecting lens to a projecting lens frame in a projecting unit wherein an image on the projecting tube is enlarged and projected on a screen by the projecting lens, said method comprising the steps of:

interposing a packing member between and in engagement with the tube frame and the lens frame such that the tube frame and the lens frame are sealingly attached and such that the frames can slide against the Packing member;

securing the tube frame and the lens frame to each other with a securing member;

adjustable separating the tube frame and the lens frame from each other by applying a separating force to the tube frame and the lens frame with a separating member;

extending a tube holding member around a front, peripheral portion of the projection tube;

extending corner tab portions from respective corners of the tube holding member towards a rear portion of the projection tube;

interposing a resilient sheet between the tube holding member and an outer wall of the projection tube;

providing a gap between the tube holding member and a fixing surface of the projection tube frame;

aligning a plurality of holes in the tube holding member with a plurality of holes in the projection tube frame; and driving a plurality of screws through the plurality of holes in the tube holding member and the projection tube frame wherein the plurality of screws span the gap, whereby said gap permits the plurality of screws to firmly press the tube holding member against the resilient sheet and the outer wall of the projection tube to thereby secure the projection tube.

43. The method of claim 42, further comprising the step of forming the resilient sheet with rubber.

* * * * *